United States Patent
Gourraud

(10) Patent No.: US 10,442,146 B2
(45) Date of Patent: *Oct. 15, 2019

(54) METHOD AND SYSTEM FOR PRODUCING AN OPHTHALMIC LENS

(71) Applicant: ESSILOR INTERNATIONAL (COMPAGNIE GENERALE D'OPTIQUE), Charenton-le-Pont (FR)

(72) Inventor: Alexandre Gourraud, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 443 days.

This patent is subject to a terminal disclaimer.

(21) Appl. No.: 15/103,643

(22) PCT Filed: Dec. 9, 2014

(86) PCT No.: PCT/FR2014/053232
§ 371 (c)(1),
(2) Date: Jun. 10, 2016

(87) PCT Pub. No.: WO2015/086981
PCT Pub. Date: Jun. 18, 2015

(65) Prior Publication Data
US 2016/0311184 A1 Oct. 27, 2016

(30) Foreign Application Priority Data
Dec. 11, 2013 (FR) ..................................... 13 62435

(51) Int. Cl.
*B29D 11/00* (2006.01)
*B33Y 80/00* (2015.01)
(Continued)

(52) U.S. Cl.
CPC ...... *B29D 11/00432* (2013.01); *B29C 64/112* (2017.08); *B29C 64/386* (2017.08);
(Continued)

(58) Field of Classification Search
CPC .......... B29D 11/00432; B29C 67/0059; B29C 67/0088; B29C 67/0092; G02B 1/041;
(Continued)

(56) References Cited

U.S. PATENT DOCUMENTS

| | | | |
|---|---|---|---|
| 2004/0046287 A1* | 3/2004 | Andino | C08G 18/6212 264/401 |
| 2009/0250828 A1 | 10/2009 | Rosen et al. | 264/1.38 |
| 2012/0251378 A1 | 10/2012 | Abe et al. | 419/55 |

FOREIGN PATENT DOCUMENTS

| | | |
|---|---|---|
| EP | 1442870 | 8/2004 |
| EP | 1896878 | 3/2008 |

(Continued)

OTHER PUBLICATIONS

International Search Report and Written Opinion issued in PCT/FR2014/053232, dated Mar. 6, 2015.

*Primary Examiner* — Mathieu D Vargot
(74) *Attorney, Agent, or Firm* — Norton Rose Fulbright US LLP

(57) ABSTRACT

A method for producing an ophthalmic lens, comprising an additive manufacturing step (100) for producing an intermediate optical element by depositing a plurality of elements of predefined volume of at least one material, said element comprising a target ophthalmic lens supplemented with at least one overthickness, and a flexible polishing manufacturing step (300) for producing said lens from said element by at least partially subtracting the overthickness so as to filter irregularities formed on said element during said additive manufacturing step; said additive manufacturing step comprising a step of defining a manufacturing setpoint (Continued)

for said element in which said overthickness is defined on the basis of predefined parameters of said flexible polishing step, i.e., a geometric characteristic representative of a spatial cutoff frequency and a geometric characteristic representative of a material removal capacity.

17 Claims, 7 Drawing Sheets

(51) Int. Cl.
| | |
|---|---|
| *B33Y 10/00* | (2015.01) |
| *B33Y 30/00* | (2015.01) |
| *B33Y 40/00* | (2015.01) |
| *B33Y 50/02* | (2015.01) |
| *G02B 1/04* | (2006.01) |
| *B29C 64/112* | (2017.01) |
| *B29C 64/386* | (2017.01) |
| *B29C 64/40* | (2017.01) |

(52) U.S. Cl.
CPC .............. *B29C 64/40* (2017.08); *B33Y 10/00* (2014.12); *B33Y 30/00* (2014.12); *B33Y 40/00* (2014.12); *B33Y 50/02* (2014.12); *B33Y 80/00* (2014.12); *G02B 1/041* (2013.01); *B29K 2995/0073* (2013.01)

(58) Field of Classification Search
CPC ......... B33Y 80/00; B33Y 10/00; B33Y 30/00; B33Y 40/00; B33Y 50/02
See application file for complete search history.

(56) References Cited

FOREIGN PATENT DOCUMENTS

| | | |
|---|---|---|
| EP | 2447046 | 5/2012 |
| GB | 2489855 | 10/2012 |
| JP | 2002-182011 | 6/2002 |
| WO | WO 2015/014380 * | 2/2015 |

* cited by examiner

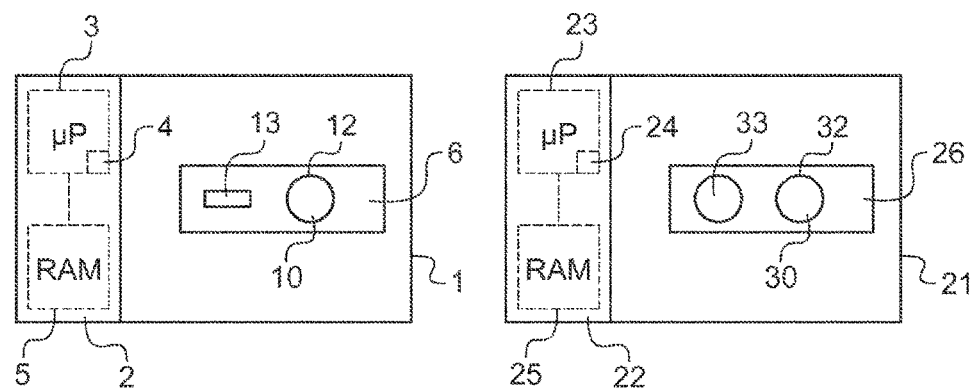
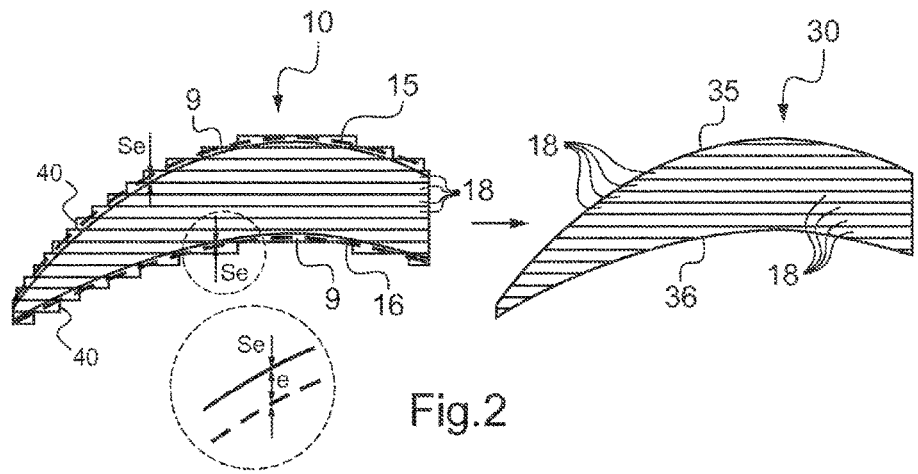
Fig.1
Fig.2

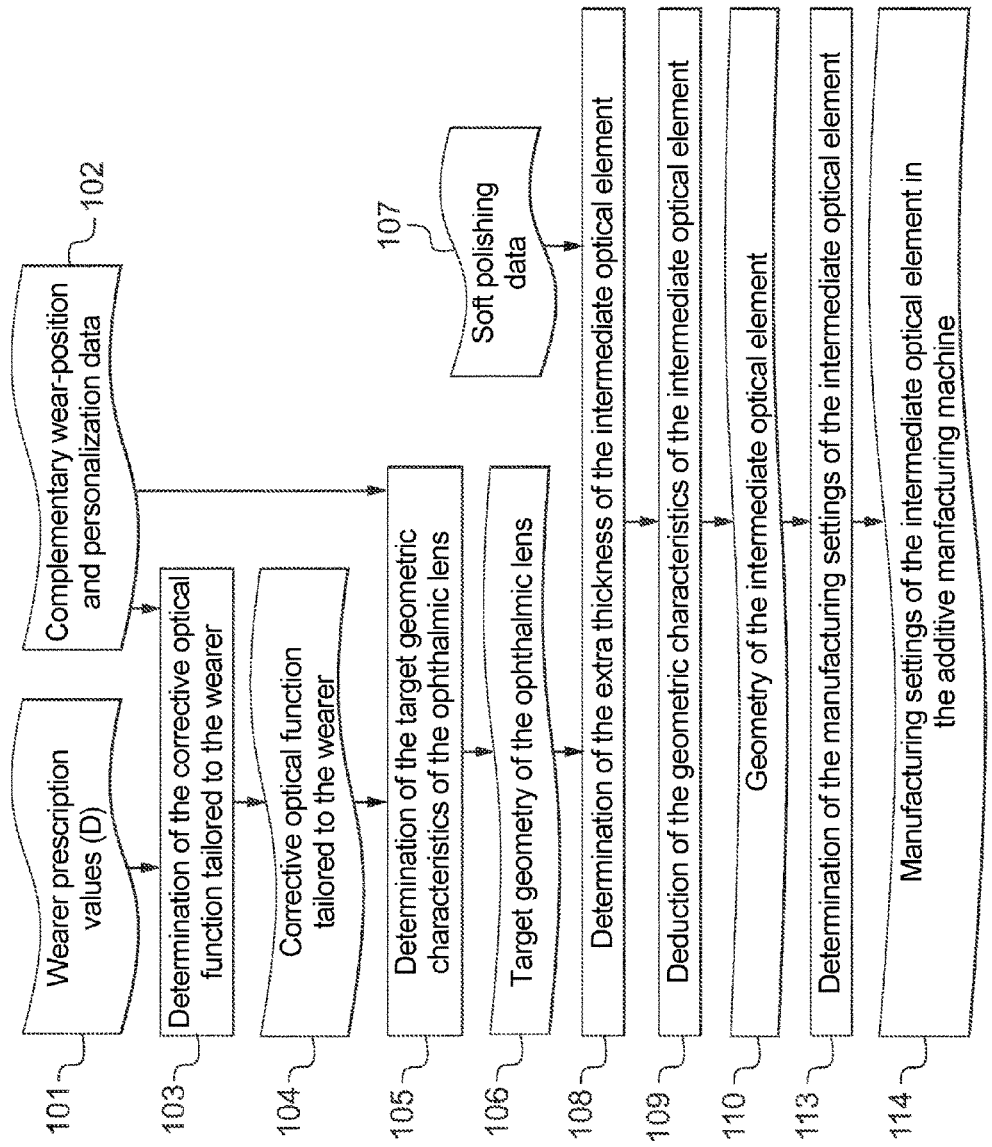

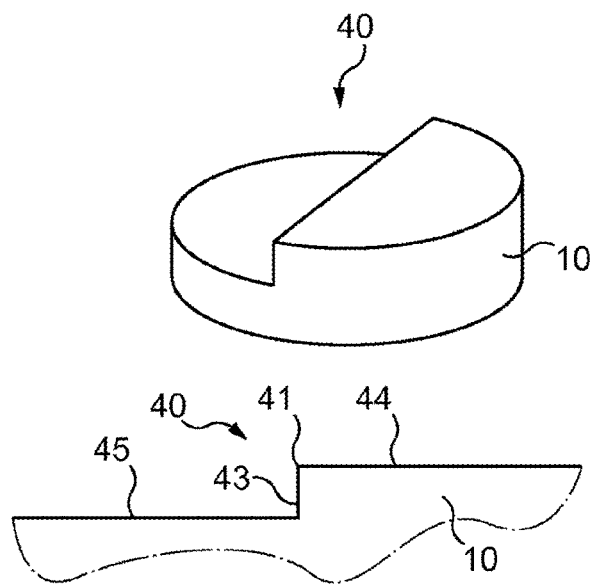
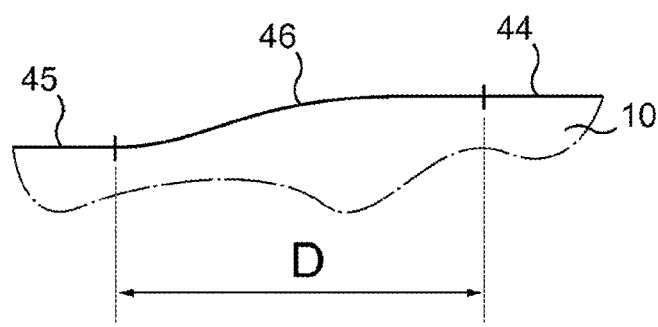
Fig.6
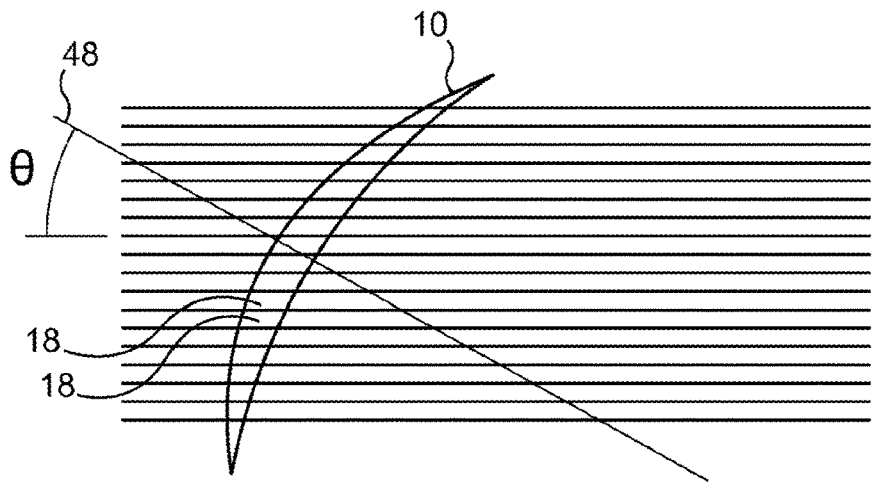
Fig.7

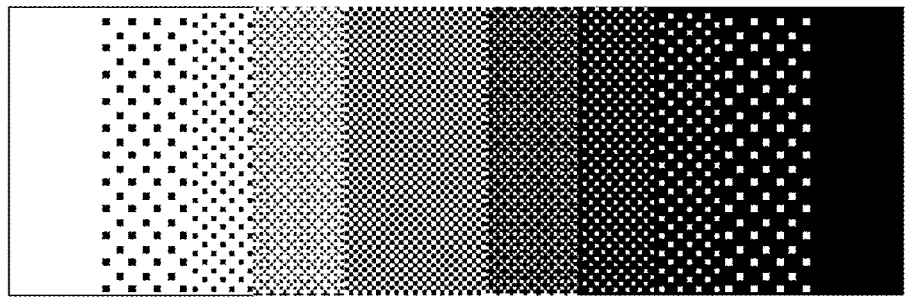
Fig.11A
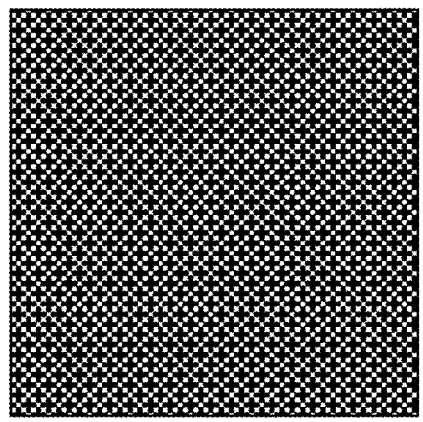 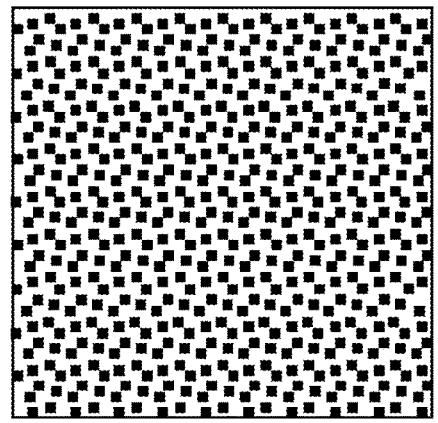
Fig.11B        Fig.11C
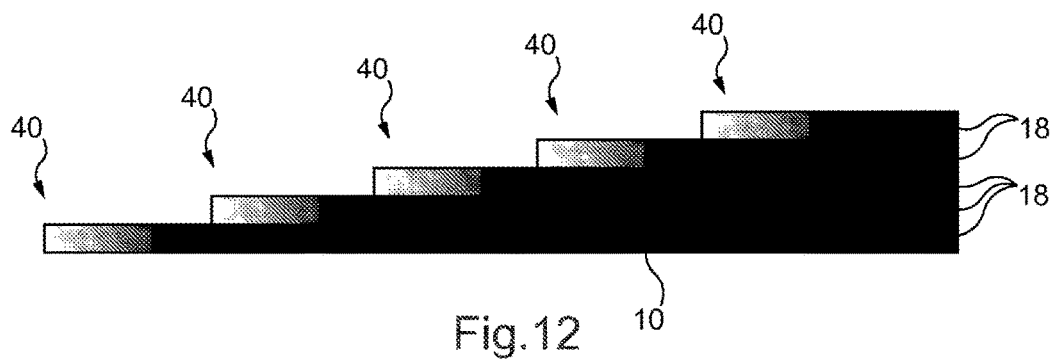
Fig.12

METHOD AND SYSTEM FOR PRODUCING AN OPHTHALMIC LENS

CROSS-REFERENCE TO RELATED APPLICATIONS

This application is a national phase application under 35 U.S.C. § 371 of International Application No. PCT/FR2014/053232 filed 9 Dec. 2014, which claims priority to French Application No. 1362435 filed 11 Dec. 2013. The entire contents of each of the above-referenced disclosures is specifically incorporated by reference herein without disclaimer.

FIELD OF THE INVENTION

The invention relates to the field of the manufacture of ophthalmic lenses having at least one optical function, for example progressive ophthalmic lenses.

The invention more particularly relates to a process for manufacturing such ophthalmic lenses.

The invention also relates to a manufacturing system configured to manufacture such an ophthalmic lens.

TECHNOLOGICAL BACKGROUND

It is known that ophthalmic lenses are subjected to various manufacturing steps in order to give them the prescribed ophthalmic properties (also referred to as "optical function").

Processes for manufacturing ophthalmic lenses are known that comprise a step of providing an unprocessed or semi-finished lens blank, i.e. a lens blank none of the faces or only one of the faces of which is what is referred to as finished (or in other words a face that defines a simple or complex optical surface).

These processes then comprise one or more steps of machining at least one face of what is referred to as the unprocessed lens blank, in order to obtain what is referred to as a finished face, defining the sought-after optical surface providing the (possibly complex) ophthalmic properties prescribed to the wearer of the ophthalmic lens.

The expression "one or more steps of machining" is here understood to mean steps of what is referred to as roughing, finishing and polishing (machining by surfacing).

The optical function of an ophthalmic lens is provided mainly by two diopters, corresponding to the front and back faces of the ophthalmic lens. The topography of the surface to be produced depends on the distribution of the applied function between the front and back faces of the lens.

The roughing step makes it possible, starting from an unprocessed or semi-finished lens blank, to give the face(s) of the lens blank which is (are) referred to as unfinished its (their) thickness and surface radii of curvature, whereas the finishing (also called smoothing) step consists in fining the grain or even the precision of the radii of curvature of the faces obtained beforehand and allows the curved surface(s) generated to be prepared (smoothed) for the polishing step. This polishing step is a step of surfacing the roughed or smoothed curved surface(s), and makes it possible to make the ophthalmic lens transparent. The roughing and finishing steps are the steps that set the thickness of the final lens and the radii of curvature of the treated surface, independently of the thickness of the initial object and of its initial radii of curvature.

It will be noted that one technology for manufacturing complex optical surfaces, called "free-form surfacing" or "digital surfacing", involves particularly precise machining, such a surface for example combining a torus and a progression. The machining of such a complex optical surface is carried out using at least one very high-precision machine tool at least for the roughing step, or even for the finishing and polishing step, and/or a polisher capable of polishing the surface(s) obtained in the preceding steps, without deforming the ophthalmic lens.

More precisely, by "roughing step" what is meant here is the step consisting in machining the intermediate optical element, by means for example of a cutter or a diamond-impregnated tool, in order to give it the thickness and radii of curvature of the target ophthalmic lens or nearly of the target ophthalmic lens; and by "finishing step", the step consisting in fining the grain and/or fining the radii of curvature of the surface of the intermediate optical element, by means for example of a diamond-impregnated tool or of a tool having an abrasive surface, in order to ready it for the polishing step. The roughing and finishing steps are therefore the steps in which the shape and curvatures of the treated surface are set, independently of the shape and curvatures of the initial surface.

Furthermore, by "polishing step" what is meant here is the step consisting in giving to the intermediate optical element, a transparency of the target ophthalmic lens by removing the traces from the surface or surfaces returned by the roughing and/or finishing. This polishing step is especially carried out by means of a soft polisher and of a fine-grain abrasive solution (grains finer than those able to be implemented in a finishing step). This step is generally called a soft polishing step. During this soft polishing step, the curvature of the (spherical or toric or pseudo-spherical or pseudo-toric) main correction (called the base curvature, and/or the curvature of an addition that may be imparted to what is called a "near vision" zone), are not notably impacted by the soft polishing step.

It will be noted that this soft polishing step is distinct from another possible machining step generally called a hard polishing step, in which are used a hard spherical or toric polisher and an abrasive solution containing grains finer than that of the abrasive solution used during the finishing step. This hard polisher acts on the surface to be treated by rotation and abrasion of this surface and confers thereon a spherical or toric curvature complementary to that of the hard polisher. In other words, the shape of the curvature of the surface treated by hard polishing is therefore the mirror image of the shape of the curvature of the surface of the hard polisher. This step of hard polishing is a variant of the finishing step described above.

SUBJECT OF THE INVENTION

The invention aims to provide a process for manufacturing an ophthalmic lens having at least one optical function, which is particularly simple, practical and economical to implement, and that is also capable of rapidly and flexibly delivering lenses having very diverse geometries and material properties, meeting a mass-market personalization requirement.

Thus, the subject of the invention, according to a first aspect, is a process for manufacturing an ophthalmic lens having at least one optical function, characterized in that it comprises:

a step of additively manufacturing an intermediate optical element by depositing a plurality of predetermined volume elements of at least one material having a predetermined refractive index, said intermediate optical element comprising a target ophthalmic lens adjoined to at least one extra thickness consisting of a portion of said plurality of volume elements; and a step of manufacturing by soft polishing said target ophthalmic lens from said intermediate optical element, by at least partial subtraction of said at least one extra thickness so as to filter asperities formed on at least one face of said intermediate optical element during said additive manufacturing step, said additive manufacturing step comprising a step of determining manufacturing settings of said intermediate optical element, in which step said extra thickness is determined depending on predetermined parameters of said soft polishing step, namely a geometric characteristic representative of a cut-off spatial frequency and a geometric characteristic representative of a material removal capacity.

The manufacturing process according to the invention is based on a combination of two manufacturing steps, namely an additive manufacturing step and a soft polishing step, and on implementation of the additive manufacturing step depending on the soft polishing step, the latter being taken into account in the determination of the manufacturing settings of the additive manufacturing step in order to obtain, after the soft polishing step, an ophthalmic lens having the desired prescription and ophthalmic or optical quality.

In other words, the combination of these two manufacturing steps forms what is referred to as a hybrid process that advantageously allows an ophthalmic lens having both the correct optical function, perfectly adjusted to the needs of the wearer, and a surface finish quality compatible with ophthalmic applications, to be obtained.

It will be noted that the additive manufacturing step allows an intermediate optical element to be obtained having a desired volume uniformity and providing at least part of the optical function tailored to the wearer; and that the soft polishing step, which is carried out after the additive manufacturing step, allows the desired optical function to be finalized and, from the intermediate optical element, an ophthalmic lens to be obtained that has a surface finish quality characterizable by roughness parameters compatible with an ophthalmic application and that has transparency, light-transmission and light-scattering properties compatible with an ophthalmic application.

By "correct optical function" what is meant is an optical function having a margin of error smaller than or equal to +/−0.12 diopters at every point of the ophthalmic lens relative to the wearer-tailored corrective optical function allowing the prescribed optical correction to be provided to the wearer.

By "surface quality compatible with ophthalmic applications" (or "ophthalmic or optical quality") what is meant is a surface quality making it possible to guarantee a light scattering factor of the ophthalmic lens lower than about 2%, preferably lower than about 1% and more preferably lower than about 0.4%.

Additive manufacturing techniques are a particularly appropriate way of meeting the objective of the invention.

The expression "additive manufacturing" is understood to mean, according to international standard ASTM 2792-12, manufacturing techniques implementing a process for fusing unitary volumes of material in order to manufacture objects from 3D modeling data (typically a computer-assisted design (CAD below) file) usually layer-by-layer, as opposed to subtractive manufacturing methodologies, such as traditional machining.

The additive manufacturing here corresponds, for example, to a three-dimensional printing process involving, for example, inkjet printing of a polymer, or a stereolithography process, or even a mask projection stereolithography process, or a selective laser melting (SLM below) or selective laser sintering (SLS below) process, or even a thermoplastic filament extrusion process.

Additive manufacturing technologies consist in manufacturing objects by juxtaposing and superposing elements of material in accordance with a predetermined arrangement contained in digital form in a CAD file. The constituent material of the additively manufactured volume elements may be solid, liquid or take the form of a gel, although it is conventional for the material to be essentially solid at the end of the additive manufacturing process.

These elementary volume elements, denoted "voxels", may be created, juxtaposed and superposed according to a variety of different technical principles, for example by depositing drops of photopolymerizable monomers by means of at least one print head, by selectively photopolymerizing with a source of UV light near the surface of a bath of monomer (stereolithography technique), or by melting polymer powder (SLM).

Additive manufacturing techniques enable a very high degree of flexibility in the geometrical definition of objects but create manufacturing defects in the surface of the additively manufactured object, here the intermediate optical element.

These manufacturing defects form asperities that are generally generated on the surface of the desired volume, because the manufacturing is by means of various juxtaposed and/or superposed discrete elements of material having a nonzero limit minimal size. These asperities are formed when at least one portion of a volume element of material protrudes from the surface of the desired volume or when a volume segment is missing from the desired volume. These asperities signify an altitude difference between at least one element of what is called high material and at least one element of what is called low material.

For example, in the case of additive manufacturing by layered superposition of a plurality of elements of material forming slices, stair-steps are arranged at the interface between a lower layer and the end of the upper layer immediately above when the lower layer extends further than the upper layer immediately above along a given axis. These stair-steps are defined by a high point, called a peak, which protrudes the most relative to an average altitude of the volume formed by the two layers and which is formed by at least the end of the upper layer, and by a low point, called a depression, or also called a pit, formed at the junction of the upper and lower layers and which represents a lack of material relative to the average altitude of the volume formed by the two layers.

It will be understood in the context of the invention that an asperity (representative of an additive manufacturing "defect") is formed by such a stair-step (or by an equivalent defect for additive manufacturing technologies not strictly using layer-by-layer manufacturing) and therefore by the material found between its peak (high point) and its depression (low point). It will be noted that the asperity of course has a thickness that depends on the constructional strategy of the intermediate optical element.

Instead of asperities, it would also be possible to speak of layer jumps or even layer fronts, representing the passage from a layer called the nth layer to another layer immediately below called the nth−1 layer. It will be noted that a layer jump illustrates an altitude variation that is not necessarily equal or about equal to the height of the nth layer, but which may be smaller than this height.

The additive manufacturing step of the process according to the invention thus allows an intermediate optical element to be obtained, this element comprising the ophthalmic lens that is referred to as the target lens and comprising, on all or some of its "future" external surface, an extra thickness, which is defined while taking into account, on the one hand, the material elimination (or removal) capacity of the polishing process used to carry out the soft polishing step, and, on the other hand, while advantageously taking into account a geometric characteristic representative of a cut-off spatial frequency of the polishing process.

As it is based on the characteristic material removal capacity and cut-off spatial frequency of the soft polishing step, the step of determining the manufacturing settings of the intermediate optical element makes it possible to take into consideration the maximum thickness envisionable for the extra thickness and the filtering capacity of a manufacturing system provided with a soft polishing machine. In other words, this determining step takes into account both the thickness and asperities that may be at least partially removed from the intermediate optical element, it being understood that the material removal capacity is here characteristic of a thickness comprised for example in the predetermined value interval [1 µm; 150 µm].

The material removal capacity of the polishing process is here defined as the thickness of material that may be abrasively removed without a polishing tool (the polisher) significantly modifying the curvature of the polished surface. The material removal capacity depends on the material that is polished, on the actuating kinematic of the polisher with respect to the polished intermediate optical element and on the structure of the polisher.

It is here possible to speak of soft polishing cut-off spatial frequency, but also of soft polishing cut-off spatial wavelength, because the soft polishing step is implemented using a polishing machine provided with a soft polisher that is configured to act on the intermediate optical element like a passband filter, in a spatial frequency space, the cut-off spatial frequency of which is determined by the properties of this polisher and the operating parameters of the polisher, in other words its actuating kinematic.

It will also be noted that such a polisher combined with such an actuating kinematic of the polisher form a pair that confers on the soft polishing machine a given soft polishing pupil. The actuating kinematic is dependent on the polisher, on the polished surface, diameter and concave or convex character of the surface, range of curvature, etc., and comprises polishing process parameters such as at least one of rotation speeds, pressures, relative movements of the polisher and the element to be polished, etc. The process parameters are generally configured so that the polishing pupil is substantially constant for every polisher/movement pair used by a given machine.

By "polishing pupil" what is meant is a disc the diameter of which corresponds to the maximum spreading diameter of a point defect obtained after a given polishing process has been implemented.

In other words, the spreading diameter is the diameter of a zone the geometry (curvature) of which after polishing is modified because of the initial presence of the defect, relative to the geometry (curvature) that would have been obtained after the same polishing if the point defect were not present.

Here, the polishing pupil is thus characteristic of the spread of a stair-step after polishing. Considering the case where this stair-step passes through the center of rotation of the lens during the polishing step, the spread may be measured at the center of rotation of the lens, perpendicularly to the stair-step.

By virtue of the manufacturing process according to the invention, additive manufacturing defects that are created on the surface of the intermediate optical element and that form a portion of the extra thickness are taken into account in the determination of the additive manufacturing settings of this optical element in order to ensure the asperities that result therefrom have an optimized position that allows these asperities to be at least partially suppressed by the soft polishing step implemented using the predetermined soft polishing pupil. In other words, the step of determining the additive manufacturing settings of the intermediate optical element is configured so that the asperities created in the additive manufacturing are filtered by the polishing pupil in the soft polishing step, with the aim of obtaining an ophthalmic lens having the required optical function and surface finish quality.

The manufacturing process according to the invention is particularly simple, easy and economical, above all when a wide variety of optical functions are to be produced, in particular because of the personalization of these optical functions, this requiring manufacturing processes that are rapid and flexible.

It will also be noted that the expression "optical function", when applied to a lens or an intermediate optical element, is understood to mean the optical response of this lens or this element, i.e. a function defining any modification of the propagation and transmission of an optical beam through the lens or optical element in question, whatever the incidence of the entering optical beam and whatever the geometric extent of the entrance diopter illuminated by the incident optical beam.

More precisely, in the ophthalmic field, optical function may be defined as the distribution of wearer-power and astigmatism characteristics and of prismatic deviations and higher-order aberrations associated with the lens or optical element for all the directions of the gaze of a wearer of this lens or this element. Of course, this assumes that the geometric position of the lens or optical element relative to the eye of the wearer is already known.

According to preferred, simple, practical and economical features of the process according to the invention:
said step of determining said manufacturing settings of said intermediate optical element is configured so that, at least in a determined zone of the face of the intermediate optical element, said asperities are spaced apart from one another by a distance smaller than a critical distance determined depending on a value of said geometric characteristic representative of the cut-off spatial frequency; and/or
said geometric characteristic representative of said cut-off spatial frequency corresponds to a diameter of a characteristic polishing pupil of said soft polishing step and the critical distance is smaller than or equal to half, preferably one quarter, or even one tenth of, the diameter of said polishing pupil.

The fact that each asperity is distant from another asperity by a distance smaller than the determined critical distance means that in for example at least three directions starting from one said asperity or from a point corresponding to a voxel positioned along an asperity or even a layer jump, there is present another respective asperity or another layer jump located in a respective zone of length equal to the determined critical distance.

In other words, it is possible to define at least three sections each of length equal to the determined critical distance, starting from a determined asperity (or from a point corresponding to a voxel positioned along this asperity) in each of which another asperity is found.

It will be noted that the at least three directions may each be represented by a half-axis originating from the determined asperity, these half-axes being shifted angularly relative to one another by one or more determined shifts. The shift between two half-axes should not be characteristic of an excessively obtuse angle, and should for example preferably be smaller than about 160°. In other words, for each given half-axis, there is at least one of the other half-axes with which it makes an angle smaller than 160° in the clockwise direction starting from the given half-axis, and at least one other of the other half-axes with which it makes an angle smaller than 160° in the counterclockwise direction starting from the given half-axis.

According to one advantageous embodiment of the process according to the invention, in which the additive manufacturing is improved, said step of determining said manufacturing settings of said intermediate optical element is configured so that said intermediate optical element is inclined relative to a predetermined additive construction axis, referred to as the stratification axis, along which said plurality of predetermined volume elements of at least one material is deposited.

In other words, this means that the optical axis of the final ophthalmic lens is inclined relative to the stratification axis, for example with an angle comprised in the interval [20°; 80°], or even in the interval [30°; 70°].

According to another advantageous embodiment of the process according to the invention, in which the additive manufacturing is also improved, said step of determining said manufacturing settings of said intermediate optical element is configured so that said intermediate optical element has, in cross section, on its face at least one manufacturing zone of a first type that is provided with at least two first segments and at least one second segment, which segments are formed in alternation, said first segments each being provided with at least one predetermined volume element of said material and said at least one second portion being at least partially devoid of predetermined volume elements of said material; by virtue of which asperities are formed in this manufacturing zone of the first type.

This means that there are for example at least three directions starting from one said determined first segment such that in each of the directions there is present both a second segment and another respective first segment that is located in a respective zone of determined length.

Preferably, the distance separating the two first segments is of the order of magnitude of the determined critical distance.

It will be noted that the at least three directions may each be represented by a half-axis originating from an asperity of said determined first segment, the half-axes being shifted angularly relative to one another by one or more determined shifts. The shift between two half-axes should not be characteristic of an excessively obtuse angle, and is for example preferably smaller than about 160°. In other words, for each half-axis, there is at least one of the other half-axes with which it makes an angle smaller than 160° in the clockwise direction, and at least one other of the other half-axes with which it makes an angle smaller than 160° in the counter-clockwise direction.

According to other preferred, simple, practical and economical features of the process according to the invention:

said at least one manufacturing zone of the first type is provided with predetermined volume elements of a material or of a plurality of distinct materials;

said at least one manufacturing zone of the first type is defined by a sliding cylinder of axis normal to the surface of the target ophthalmic lens, the total volume of the extra thickness in this sliding cylinder remaining substantially constant; and/or said sliding cylinder has a diameter similar to or smaller than that of a characteristic polishing pupil of said soft polishing step.

According to yet another advantageous embodiment of the process according to the invention, in which the additive manufacturing is also improved, said step of determining said manufacturing settings of said intermediate optical element is configured so that said intermediate optical element has, in cross-section, on its face at least one manufacturing zone of a second type, provided with a plurality of predetermined volume elements of one or more materials, said predetermined volume elements having distinct abradability properties.

According to yet other preferred, simple, practical and economical features of the process according to the invention:

said additive manufacturing step is configured to form a plurality of superposed layers of said predetermined volume elements, and said intermediate optical element thus manufactured has at least two said manufacturing zones of the first type and/or of the second type, which zones are formed in distinct layers; and/or said additive manufacturing step is configured to form a plurality of superposed layers of said predetermined volume elements, and said intermediate optical element thus manufactured has at least one said manufacturing zone of the first type and/or of the second type, which zone is formed in at least two immediately superposed layers.

Another subject of the invention, according to a second aspect, is a system for manufacturing an ophthalmic lens, including an additive manufacturing machine, for manufacturing an intermediate optical element, and a soft polishing machine for manufacturing an ophthalmic lens from said intermediate optical element, and at least one command-control unit provided with systemic elements configured to run a computer program including instructions configured to implement each of the steps of the process such as described above.

According to preferred, simple, practical and economical features of the system according to the invention:

said soft polishing machine has a polisher and an actuating kinematic of said polisher, which is dependent on said polisher, which polisher and actuating kinematic pair confer on said soft polishing machine a given soft polishing pupil and a given material removal capacity;

said additive manufacturing machine is a three-dimensional printing, or stereolithography, or mask projection stereolithography machine or even a selective laser melting or sintering machine, or a thermoplastic filament extrusion machine; and/or said additive manufacturing machine includes a manufacturing holder that is removable and configured to serve as a manufacturing holder for the soft polishing machine.

BRIEF DESCRIPTION OF THE DRAWINGS

The subject matter of the invention will now be explained by way of a description of one embodiment thereof, given, by way of nonlimiting illustration, below with reference to the appended drawings, in which:

FIG. 1 schematically shows a manufacturing system provided with an additive manufacturing machine and a soft polishing machine, these machines being configured to produce an ophthalmic lens;

FIG. 2 schematically shows an intermediate optical element additively manufactured with the additive manufacturing machine of the system illustrated in FIG. 1 and an ophthalmic lens manufactured by soft polishing from the intermediate optical element with the soft polishing machine of the system illustrated in FIG. 1;

FIG. 4 is a flowchart showing the step of determining additive manufacturing settings of the intermediate optical element.

FIG. 6 schematically shows the action of a soft polishing machine tool of the system illustrated in FIG. 1 on the intermediate optical element of FIG. 2;

FIGS. 7 and 8 partially and schematically show the intermediate optical element in FIG. 2 according to two variant implementations of the process according to the invention, said variants relating to first and second improved additive manufacturing strategies, respectively;

FIGS. 9A and 9B, 10A and 10B and 11A to 11C illustrate three variant embodiments of the second improved additive manufacturing strategy, respectively; and FIG. 12 partially and schematically shows the intermediate optical element of FIG. 2 according to another variant implementation of the process according to the invention, relating to a third improved additive manufacturing strategy.

DETAILED DESCRIPTION OF AN EXEMPLARY EMBODIMENT

Figure 3:
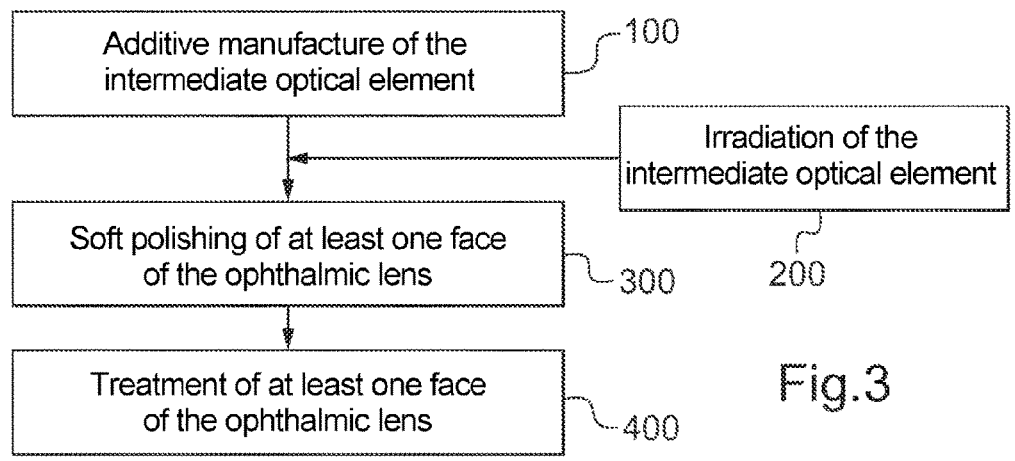
FIG. 3 is a flowchart illustrating various operating steps of a process for manufacturing an ophthalmic lens.

FIG. 1 illustrates a system for manufacturing an ophthalmic lens 30, including an additive manufacturing machine 1, here a digitally controlled three-dimensional printing machine, and a soft polishing machine 21 that is also digitally controlled.

The expression "digitally controlled" designates all the hardware and software especially having the function of giving movement instructions to all the members of the additive manufacturing and soft polishing machines 1, 21.

The additive manufacturing machine 1 is here configured to deposit, by juxtaposition, a plurality of predetermined volume elements forming superposed layers, in other words layer-by-layer, of at least one material on a manufacturing holder 12 so as to form an intermediate optical element 10.

This intermediate optical element 10 is configured to form an ophthalmic lens 30.

This ophthalmic lens 30 is for example progressive and furthermore possesses toric and prismatic components.

Each predetermined volume element is defined by a predetermined composition, a predetermined position in space and predetermined dimensions at an instant t.

As it is here a question of additive manufacturing and in particular of three-dimensional printing, volumetric elements or volume elements, also referred to as voxels (three-dimensional pixels), are also spoken of.

This intermediate optical element 10 is therefore borne by the manufacturing holder 12.

It will be noted that this manufacturing holder 12 is a predetermined holder of the additive manufacturing machine 1 and therefore its geometric characteristics are known and contained in a file that is stored in or loaded into a first command-control unit 2 of the additive manufacturing machine 1.

The manufacturing holder 12 of the additive manufacturing machine 1 comprises a body provided with a manufacturing surface that has an overall geometry that is entirely or partially independent of the geometry of at least one surface of the intermediate optical element to be produced by additive manufacturing.

The manufacturing holder 12 may be removable and be configured to be usable in the soft polishing machine 21 used in addition to the additive manufacturing machine 1.

All the hardware and software of the additive manufacturing machine 1 is furthermore configured to generate movement, handling and control instructions for materials and polymerization devices that this machine 1 comprises.

The additive manufacturing machine 1 comprises a nozzle or a bank of nozzles 13 in addition to the first command-control unit 2, and the latter is provided with a data processing system comprising a microprocessor 3 equipped with a memory 4, in particular a nonvolatile memory, allowing the microprocessor 3 to load and store a software package, in other words a computer program, that, when it is run in the microprocessor 3, allows an additive manufacturing method to be implemented. This nonvolatile memory 4 is for example a read-only memory (ROM).

The first unit 2 furthermore comprises a memory 5, in particular a volatile memory, allowing data to be stored while the software package is being run and the additive manufacturing method implemented.

This volatile memory 5 is for example a random access memory (RAM) or an electrically erasable programmable read-only memory (EEPROM).

The additive manufacturing machine 1 in addition comprises an aperture 6, here filled with a window, configured to allow access to the intermediate optical element 10 additively manufactured by this machine 1 on the manufacturing holder 12 of the latter; this aperture is optionally in the machine.

It will be noted that in order to additively manufacture the intermediate optical element 10, it is necessary to know with precision certain additive manufacturing parameters, such as the speed of advance of the nozzle or nozzles 13 and the type of energy and energy source employed; here a source emitting in the ultraviolet is employed in the three-dimensional printing machine but it could be a laser in the case of a stereolithography machine or else thermal energy could be used, as is the case with tensioned filament deposition, also referred to as thermoplastic filament extrusion.

It is also necessary to know precisely which one or more materials are being used and their states, here these materials take the form of polymerizable compositions, or of thermoplastic polymer filaments, droplets, or powders.

It is also necessary to know with precision the simple or complex optical functions prescribed to the ophthalmic lens 30, which optical functions are characterized by geometries defined in a manufacturing file characteristic of the simple or complex optical properties of the ophthalmic lens 30.

According to a variant, it is also necessary to know personalization parameters of the wearer and/or parameters of the geometry of the frame intended to receive the ophthalmic lens 30, in order to adjust the optical function of the ophthalmic lens to its final use conditions.

It will be noted that it is possible to define a simple optical function as being the optical function obtained with spherical or toric surfaces.

A contrario, it is possible to define a complex optical function as being the optical function obtained with at least one surface that is not simple, i.e. for example an aspherical or atoric surface or a surface having a function associated with framing, or even a freecurve function.

In addition, it is possible to define an additional optical function as being an optical function that exhibits a possibly continuous power variation, as perceived by a wearer, as a function of position on the eyeglass and/or as a function of time. This may for example be a progressive optical function or a multifocal optical function such as a bifocal or trifocal function, or an optical function the power of which is controlled over time, such as may for example be the case for a fluid lens or a lens having an active function or an informative lens.

Knowing the optical function, the optical index of the one or more materials used to form the final lens and certain personalization and/or frame parameters makes it possible to define the geometric envelope (also referred to as the three-dimensional external envelope) required for the ophthalmic lens 30. This required geometric envelope defines the geometric characteristics of the ophthalmic lens 30. This three-dimensional external envelope encompasses a geometric envelope of the ophthalmic lens and one or more extra thicknesses Se that are adjoined to all or some of at least one face of the ophthalmic lens 30.

It will be recalled that by "optical function" of a lens or an optical element, what is meant is the optical response of this lens or this element, i.e. a function defining any modification of the propagation and transmission of an optical beam through the lens or optical element in question, whatever the incidence of the entering optical beam and whatever the geometric extent of the entrance diopter illuminated by the incident optical beam.

More precisely, in the ophthalmic field, optical function is defined as the distribution of wearer-power and astigmatism characteristics and of prismatic deviations and higher-order aberrations associated with the lens or optical element for all the directions of the gaze of a wearer of this lens or this element. Of course, this assumes that the geometric position of the lens or optical element relative to the eye of the wearer is already known.

It will also be noted that wearer power is a way of calculating and adjusting the power of the ophthalmic lens, which is different from lensmeter power. Calculation of wearer power ensures that the power perceived by the wearer (i.e. the power of the beam of light that enters into the eye), once the lens has been fitted in the frame and is being worn by the wearer, corresponds to the prescribed power. In general, for a progressive eyeglass, at any point on the eyeglass and especially at its far-vision and near-vision reference points, the power measured with a lensmeter is different from the wearer power. However, the wearer power at the optical center of a unifocal lens is generally close to the power observed with a lensmeter positioned at this point.

The soft polishing machine 21 is here configured to machine by polishing, at least all or some of the additively manufactured intermediate optical element 10, in order to form the target ophthalmic lens 30. The intermediate optical element 10 is borne by and held in a working position on a manufacturing holder 32 of the machine 21. This working position may be predetermined or more generally correspond to a position allowing the intermediate optical element to be geometrically centered relative to the paths followed by the polishing tool of the machine 21.

It will be noted that this manufacturing holder 32 is a predetermined holder of the machine 21 and therefore that its geometric characteristics and location in the machine are known and contained in a file that is stored in or loaded into a second command-control unit 22 of the subtractive manufacturing machine 21.

It will be noted that the manufacturing holders 12 and 32 may be one and the same holder and/or that the manufacturing holder 32 may advantageously itself be produced by additive manufacturing such as defined in the context of the invention.

The machine 21 is thus configured to soft polish all or some of the surface of the intermediate optical element 10, including in the case where the intermediate optical element has a surface of a progressive eyeglass, furthermore optionally possessing toric and prismatic components.

The soft polishing machine 21 includes a spindle bearing a polishing tool 33, for example a polisher having a predetermined diameter, in order to polish and smooth the asperities present on the surface of the intermediate optical element obtained at the end of the additive manufacturing step. It also includes the second command-control unit 22, which is similar to the first unit 2 of the additive manufacturing machine 1.

The paths followed by the polishing tool of the machine 21 are defined by an actuating kinematic of the polisher, which kinematic furthermore corresponds to the pressures applied to the polisher and to the intermediate optical element polished in the polishing step.

The pair formed by the polisher and the actuating kinematic of the polisher allows a characteristic polishing pupil of the soft polishing step to be defined (see below).

This second unit 22 is thus provided with a data processing system comprising a microprocessor 23 equipped with a memory 24, especially a nonvolatile memory, allowing the microprocessor 23 to load and store a software package, in other words a computer program, that, when it is run in the microprocessor 23, allows a subtractive manufacturing process, and here more particularly a sequence of at least one machining step from a finishing step and a polishing step, to be implemented. This nonvolatile memory 24 is for example a read-only memory (ROM).

All the hardware and software of the additive manufacturing machine 21 is furthermore configured to give movement and handling instructions to all the members that this machine comprises and especially its spindle 33.

The second unit 22 furthermore comprises a memory 25, in particular a volatile memory, allowing data to be stored while the software package is being run and the soft polishing process being implemented.

This volatile memory 25 is for example a random access memory (RAM) or an electrically erasable programmable read-only memory (EEPROM).

The soft polishing machine 21 in addition comprises an optional aperture 26, here filled with a window, configured to allow access to the ophthalmic lens 30 manufactured by soft polishing by this machine 21 on the manufacturing holder 32 of the latter.

It will be noted that to manufacture by soft polishing the target ophthalmic lens 30 from the intermediate optical element 10, it is necessary to know precisely certain polishing parameters, such as for example the speed of rotation of the intermediate optical element, the scan speed of the polisher, the number of scans of the polisher, the pressure that the polisher exerts on the surface of the optical element, the path followed by and the amplitude of the scan of the polisher, the diameter of the polisher, and the size and concentration of the abrasive particles that are present in the slurry used during the polishing process.

These parameters allow the soft polishing step to be given defined smoothing (or filtering) capacities, which are for example characterized by its cut-off spatial frequency and/or its cut-off spatial wavelength, or by its polishing pupil.

FIG. 2 schematically shows an ophthalmic lens 30 obtained from an intermediate optical element 10 additively manufactured on the manufacturing holder.

On the left in FIG. 2 is shown the additively manufactured intermediate optical element 10, whereas on the right of this figure is shown the target ophthalmic lens 30 manufactured by soft polishing from this intermediate optical element 10.

The intermediate optical element 10 has a body provided with a first face 15 that here is convex, and a second face 16 that here is concave. This second face 16 is that which here faces the surface of the manufacturing holder on which the intermediate optical element 10 is additively manufactured.

As a variant, an inverse construction consisting in having a convex second face 16 may be produced, and/or the first face 15 may have a concave profile.

This intermediate optical element 10 has a peripheral edge face connecting the first face 15 to the second face 16.

It will be noted that the intermediate optical element 10 has here been manufactured directly with an outline matching a shape of a predetermined frame in which the target ophthalmic lens 30 is configured to be fitted.

As a variant, the intermediate optical element may have a peripheral edge face forming an outline slightly different to that desired for the ophthalmic lens, for example slightly smaller or slightly larger than an outline configured to be inserted into the predetermined frame, or comprising extensions in order to allow the lens to be handled, or for another reason.

It will be noted that in the case where the intermediate optical element has a peripheral edge face forming an outline slightly larger than an outline of the edge face of the ophthalmic lens, the complementary outline may also comprise a portion of the extra thickness produced in the additive manufacturing step, in particular in order to facilitate the polishing step and to decrease the appearance of possible edge effects.

In another variant, the intermediate optical element may have at least one means allowing the ophthalmic lens to be held in a predetermined frame, this means being produced in the additive manufacturing step. This means may for example be formed by one or more holes arranged in the intermediate optical element, passing through at least one of the faces, for fastening frames requiring drilled eyeglasses, and/or a groove for receiving a nylon wire for a "nylor" type frame, and/or a bevel in order to allow the lens to be housed by complementarity in a full-rimmed frame.

It will be noted that the possibility of manufacturing an ophthalmic lens already having a shape suitable for insertion into a predetermined frame may allow the risk of misalignment of eyeglasses possibly resulting from an edging step possibly carried out in-shop to be decreased; and/or this possibility may furthermore make it possible to decrease the stocks of semi-finished lenses generally required.

The intermediate optical element 10 is here formed by a plurality of predetermined volume elements that are juxtaposed and superposed to form a plurality of superposed layers of a material 18. These predetermined volume elements may have a different geometry and be different volumes from each other, as the implementation of such an additive manufacturing process conventionally allows. These volume elements may also consist of the same material, or as a variant may consist of at least two different materials, for example having distinct refractive indices and/or distinctive abradability properties.

It will be noted that the use of at least two materials having different refractive indices may for example allow optimized functional and optical properties to be given to the target ophthalmic lens; whereas the use of at least two materials having different abradability properties is particularly advantageous in the determination of the additive manufacturing settings in order to optimize the geometry of the extra thickness and to deposit the most suitable material(s) depending on the subsequent step of soft polishing.

This plurality of superposed layers forms the body, together with the first face 15 and the second face 16, of this intermediate optical element 10.

It will be noted that the superposed layers of the first material 18 here have different lengths so as to form the first and second faces 15 and 16 of this intermediate optical element 10.

It will be noted that the notion of "layers" is only nominally applicable to certain additive manufacturing technologies, a layer then merely being a set of voxels artificially deposited in a given pass of the nozzles or with a given mask and not necessarily forming slices of material. However, the teaching of the present invention is easily transferred to these technologies.

These layers here each have a substantially constant thickness over their length and they all have substantially the same thickness. It will be noted that certain additive manufacturing technologies may produce layers with thicknesses that vary along the length of the layer. However, the teaching of the present invention is easily transferred to these technologies.

It will be noted that this substantially constant thickness of the layer is obtained here by virtue of controlled deposition, by the nozzle or the bank of nozzles 13 of the additive manufacturing machine 1, of a determined quantity of predetermined volume elements for each superposed layer of the material 18.

Here, the material 18 is an acrylic polymer, and more precisely a photopolymer, for example a photopolymer such as the product marketed by the company OBJET Ltd, under the trademark VeroClear™.

It will be noted that the additive manufacture of the intermediate optical element 10 may require, in addition to the deposition of the plurality of successive superposed layers, one or more photopolymerization steps.

The photopolymerization steps may be implemented on deposition of each volume element or a blanket photopolymerization may be carried out after one pass of the nozzle and/or the bank of nozzles or after each layer of volume elements has been deposited.

Moreover, it will be noted, as will be seen below in more detail, that the polymerization of intermediate optical element 10 may be incomplete at the end of the additive manufacturing step of this intermediate optical element 10.

The body of the intermediate optical element 10 here includes two extra thicknesses 9 arranged on either side of the body on the first and second faces 15 and 16, respectively.

The geometry of the intermediate optical element 10 is here designed so as to have an extra thickness 9, of thickness denoted Se, that covers at least one of the first and second faces 15 and 16, relative to the geometric envelope of the target ophthalmic lens 30.

It will be noted that the thickness Se of this extra thickness 9 is defined in the invention as the distance between the surface of the geometric envelope of the target ophthalmic lens 30 and a surface that is referred to as the interior surface of the intermediate optical element 10, in other words the surface defined by those points of each layer of the surface of the intermediate optical element which are locally closest to the surface of the final (target) ophthalmic lens. In particular, the interior surface corresponds to a surface defined by the depressions of the asperities such as defined above.

Thus, locally, the thickness Se of the extra thickness 9 is defined so as to take into account neither local thickness variations due to the peaks and depressions of the asperities, nor the altitude variations associated with the junction of neighboring voxels, nor the "stair-step jumps" between two superposed layers or sheets.

In addition, the thickness Se of the extra thickness 9 has a substantially constant value at every point relative to the geometric envelope of the ophthalmic lens, modulo the amplitude of the asperities.

Preferably, over the entirety of the intermediate optical element, the thickness Se of the extra thickness 9 is comprised in the interval [1 µm; 150 µm]. The average extra thickness over the entirety of the lens may be comprised in the interval [10 µm; 100 µm], and preferably in the interval [10 µm; 50 µm].

In particular, the thickness Se of the extra thickness 9 is chosen to be larger than or equal to 2 times a maximum amplitude of the asperities and smaller than the material removal capacity of the soft polishing step. Preferably, the thickness Se of the extra thickness 9 is chosen to be larger than or equal to three times a maximum amplitude of the asperities. The amplitude of an asperity may be measured by evaluating the peak-depression amplitude along an axis passing through the local normal to the target surface of the ophthalmic lens.

It will be noted that to simplify the choice of the value of the thickness Se, in other words to make it so that there is no need to calculate the amplitude of each asperity, the thickness Se of the extra thickness 9 may be chosen to be larger than or equal to two times and preferably three times a height of a voxel. The voxel height used as reference may be chosen as being the average height of the voxels used near the surface of the intermediate optical element, or the maximum height of the voxels used near the surface of this intermediate optical element. Or indeed, this may be the average height (of the voxels) employed to manufacture the intermediate optical element by additive manufacturing. Alternatively, this may even be another dimension of a voxel.

The material removal capacity of the polishing process is defined as the thickness of material that may be abrasively removed without the polishing tool significantly modifying the curvature of the polished surface. The material removal capacity depends on the material that is polished, on the actuating kinematic of the polisher with respect to the polished intermediate optical element and on the structure of the polisher.

This value may be identified for example by polishing with various polishing times a sample of lenses having surfaces representative of the range of surfaces to be polished with this machine. For example, it is possible to choose a series of finished lenses of base 2 to 6, comprising toric surfaces and spherical surfaces, with and without additions, when evaluating a planar polisher. Next, the deviation in the curvature occasioned by the polishing may be measured for each lens. When this deviation is larger than 0.12 diopters and preferably 0.06 diopters for at least one lens, the maximum polishing thickness for this material, i.e. the thickness obtained by implementing this polishing process, may be considered to have been exceeded.

It will be noted that in the body of the intermediate optical element 10 two dashed lines and two continuous lines are shown that each follow substantially the cross-sectional shape of the first and second faces 15 and 16 of the intermediate optical element 10.

The continuous and dashed lines placed in proximity to a respective face are located at a distance from each other, which distance corresponds to the thickness Se of the respective extra thickness 9.

It will be noted that the continuous lines define what is called the target geometry of the target ophthalmic lens 30 to be manufactured, whereas the dashed lines define the thickness of the geometry of the intermediate optical element 10 to be manufactured.

The geometry of the intermediate optical element 10 to be additively manufactured is determined depending on the soft polishing step.

Thus, in FIG. 2, the extra thicknesses 9 added to the first and second faces 15 and 16 have average thicknesses referenced Se that are each equal to a determined thickness, referenced e (see the detail view in FIG. 2), which thickness corresponds to a thickness of material removed in the soft polishing step.

In other words, the intermediate optical element 10 is here manufactured so as to have a determined geometry, with two extra thicknesses 9 each representative of a determined geometric envelope arranged on either side of the target lens 30; in order to subsequently undergo one and only one step of material removal by soft polishing, implemented by the soft polishing machine 21 and configured to remove a thickness e from each of the first and second faces 15 and 16 of the element 10.

This thickness e here corresponds approximately to the thickness Se of the added extra thicknesses 9 of the material elements protruding from the "virtual surface" of the intermediate optical element 10 (dashed line).

The extra thicknesses 9 and the thickness e (called the determined thickness) of material removed are here similar and comprised in an interval of values about equal to [1 µm; 150 µm]. The extra thicknesses 9 are not necessarily identical on each of the two faces of the intermediate optical element 10.

It will be noted that this step requires the geometry of the intermediate optical element 10 to allow the geometry and the surface finish quality desired for the target ophthalmic lens 30 to be obtained in a single soft polishing step. It is therefore advisable for the intermediate optical element 10 to be designed with a geometry that allows the geometry and the surface finish quality desired for the target ophthalmic lens 30 to be obtained in a single soft polishing step.

Implementing this single soft polishing step on the intermediate optical element 10 allows the target ophthalmic lens 30 illustrated, in cross section, on the right in FIG. 2 to be obtained, this lens having the optical function, here complex, prescribed thereto.

This target ophthalmic lens 30 thus manufactured includes a body having a front face 35 and a back face 36 opposite the front face 35, and an outline that here is identical to that of the intermediate optical element 10.

Specifically, the intermediate optical element 10 has here been manufactured directly with an outline matching a shape of a predetermined frame in which the target ophthalmic lens 30 is configured to be fitted.

The target ophthalmic lens 30 furthermore has the optical function, here complex, prescribed thereto.

A process for manufacturing this target ophthalmic lens 30 will now be described in more detail with reference to FIGS. 3 and 4.

The manufacturing process comprises the step 100 of additively manufacturing the intermediate optical element 10 with the additive manufacturing machine 1, according to a set geometry.

The process optionally comprises the step 200 of irradiating the intermediate optical element 10 obtained. This step 200 completes the polymerization of the intermediate optical element 10.

The process furthermore includes the step 300 of manufacturing the ophthalmic lens 30 by soft polishing of the intermediate optical element 10, with the soft polishing machine 21.

The process optionally comprises the step 400 of treating the front face and/or back face of the ophthalmic lens thus obtained by additive manufacturing then soft polishing, in order to add thereto one or more predetermined functional coatings, for example an antifog and/or antireflection coating and/or a tinted coating and/or a photochromic and/or anti-scratch coating, etc.

FIG. 4 illustrates steps of the manufacturing process and more precisely steps for determining manufacturing settings of the intermediate optical element 10 with a view to its additive manufacture by virtue of the additive manufacturing machine 1 illustrated in FIG. 1; and therefore with a view to providing this intermediate optical element 10 for one of steps 200 and 300 of the process illustrated in FIG. 4.

The command-control unit 2 (called the first unit) of the additive manufacturing machine 1 is configured to receive in step 101 a file containing prescription values of a wearer of the ophthalmic lens 30 to be manufactured.

These prescription values of the wearer are generally expressed in diopters (D).

The first unit 2 is furthermore configured to receive, in the step 102, complementary fitting and personalization data relating to the wearer, to a frame intended to receive the ophthalmic lens 30 and to the prescription.

It will be noted that these complementary fitting and personalization data for example correspond to geometric values that especially characterize the frame and the visual behavior of the wearer. It may for example be a question of an eye-lens distance and/or a position of the eye rotation center, and/or of an eye-head coefficient, and/or of a pantoscopic angle and/or of a face-form angle of the frame and/or of the outline of the frame. It may also merely be a question of the geometric position of the ophthalmic lens 30 relative to the eye of the wearer.

The first unit 2 is configured to determine in the step 103 a corrective optical function tailored to the wearer from the wearer prescription values and complementary fitting and personalization data received in the respective steps 101 and 102, and depending on the geometric position of the lens 30 relative to the eye of the wearer.

This corrective optical function tailored to the wearer corresponds to the target optical function of the ophthalmic lens 30 to be manufactured.

It will be noted that the corrective optical function tailored to the wearer may be determined for example using a ray tracing software package, which allows the wearer power and the resulting astigmatism of the lens to be determined for the wear conditions of the latter. An optimization may be carried out using well-known optical optimization methods.

The first unit 2 is configured to generate in the step 104 a file named "optical function" that characterizes this corrective optical function tailored to the wearer, as determined in the step 103.

It will be noted that the corrective optical function tailored to the wearer may, instead of being determined by the first unit 2 in the step 103, be received directly by this first unit 2 in the form of such a file.

The first unit 2 is configured to determine, in the step 105, target geometric characteristics for the ophthalmic lens 30 to be manufactured, from the "optical function" file generated in the step 104 and from complementary fitting and personalization data received in the step 102, and in particular the data related to the frame provided to receive the ophthalmic lens 30.

The first unit 2 is configured to generate in the step 106 a file named "target geometry" that characterizes the geometric characteristics of the ophthalmic lens 30 to be manufactured, as determined in the step 105.

It will be noted that this "target geometry" file is what is called a surface file that for example contains geometric characteristics taking the form of x, y, z, θ coordinates of a finite number of points, or the form of a surface function $z=f(x,y)$ defining each face, characteristics associated with a refractive index, and various distances and angles such as those mentioned above. The "target geometry" file is in fact representative both of the optical function and of the geometry to be given to the ophthalmic lens 30.

The first unit 2 is furthermore configured to receive in the step 107 a file containing soft polishing data of the soft polishing machine 21. It may for example be a question of the diameter of the polishing pupil and/or the smoothing (or filtering) capacities of the machine that are for example characterized by its cut-off spatial frequency and/or its cut-off spatial wavelength. It may also be a question of technical parameters of the soft polishing machine such as the speed of rotation of the intermediate optical element, the scan speed, the number of scans, the pressure that the polisher exerts on the surface of the optical element, the path followed by and the amplitude of the scan of the polisher, the mechanical properties of the polisher (including its dimensions and its structure), the size, the concentration and/or the hardness of the abrasive particles.

To guarantee a maximum filtering efficacy for the soft polishing, the soft polishing cut-off spatial wavelength is preferably as long as possible; whereas, to be considered as non-deforming, a soft polishing step preferably has the shortest possible soft polishing cut-off spatial wavelength.

To implement a soft polishing step that is effective for an ophthalmic lens, i.e. that filters the asperities creating optical defects, without deforming the curvature of the geometric envelope of the lens, and that allows a given optical function to be obtained, the soft polishing cut-off spatial wavelength must preferably be comprised between about 0.5 mm and 5 mm, and preferably between about 0.5 mm and 2.5 mm.

The first unit 2 is furthermore configured to receive (step not shown) a file containing characteristics related to the refractive index of the material 18 used to additively manufacture the intermediate optical element 10.

The first unit 2 is configured to determine, optionally, a dimensional shrinkage and an index variation of the intermediate optical element 10. It is here a question of possible subsequent changes, on the one hand, to the refractive index of the material 18 in which the intermediate optical element 10 is manufactured, and on the other hand, to the geometry (dimensional shrinkage) of the intermediate optical element 10, for example during a baking step.

The first unit 2 is configured to determine in the step 108 the extra thicknesses 9 to be added to the intermediate optical element 10 from characteristics and values generated or received in the files at least in the steps 106 and 107 and relating to the target geometry of the ophthalmic lens 30 to be manufactured and to the soft polishing data, respectively, and from the value of the index of the manufacturing material of the intermediate optical element 10 and characteristics relating to possible dimensional shrinkage and to possible variation in the index of the intermediate optical element 10.

The first unit 2 is configured, in the step 109, to deduce geometric characteristics of the intermediate optical element 10 to be manufactured, from the values of the thickness Se of the extra thicknesses 9 determined in step 108, in combination with the "target geometry" file generated in step 106 and characteristic data of the predetermined soft polishing step.

It will be noted that these geometric characteristics of the intermediate optical element 10 are thus deduced in such a way that the extra thicknesses are representative of the difference in geometry between the target geometry of the ophthalmic lens 30 and the geometry of the intermediate optical element 10.

The first unit 2 is furthermore configured to generate, in step 110, depending on the subsequent soft polishing step, a file that characterizes those geometric characteristics of the intermediate optical element 10 which were deduced in step 109 and are representative of the desired geometry.

This file preferably contains geometric characteristics of the intermediate optical element and/or of the extra thicknesses, and optionally of the ophthalmic lens. It is a question of what is called a surface file that for example contains geometric characteristics taking the form of x, y, z, θ coordinates, or the form of a surface function z=f(x,y) defining each face, at a finite number of points, characteristics associated with a refractive index, and various distances and angles such as those mentioned above.

In other words, this file, which is referred to as a surface file, reflects a description of the geometry desired for the intermediate optical element 10 to be manufactured, with, in practice, a determined arrangement of the predetermined volume elements of the one or more materials.

This surface file may for example be displayed in the form of 3-D modelling data typically in a CAD design file, in order to show the intermediate optical element including the target ophthalmic lens and the extra thicknesses as a digital object.

The geometry of the intermediate optical element 10 is here defined so as to directly match the outline of the frame in which the lens 30 is configured to be fitted. And edging step is therefore not necessary. As a variant, the outline of the element 10, as defined in this file, does not correspond to the outline of the frame and an edging operation is required.

The first unit 2 is furthermore configured to determine in the step 113 the manufacturing settings of the intermediate optical element 10, from characteristics contained in the file generated in step 110 relating to the geometry of the intermediate optical element 10.

The first unit 2 is configured to generate in the step 114 the manufacturing file corresponding to the manufacturing settings of the intermediate optical element 10 on the manufacturing holder 12 of the additive manufacturing machine 1 (in a known coordinate system of this machine).

This "settings" file is similar to the geometry file of the intermediate optical element 10 generated in step 110, the difference being that it reflects a transcribed description of the geometry desired for this intermediate optical element 10 to be manufactured, with, in practice, an arrangement of the predetermined volume elements of the one or more materials, relative to a frame of reference of the additive manufacturing machine, and an order of deposition of the volume elements relative to one another.

It will be noted here that both the geometry of the intermediate optical element 10 and the arrangement and order of deposition of the voxels are determined depending on one or more additive manufacturing strategies so as to form in the intermediate optical element 10 manufacturing zones of various types.

These additive manufacturing strategies may for example include a determined inclination of the intermediate optical element 10 on the manufacturing holder 12 for its manufacture and/or a manufacture improved in amount of material added and/or quality of the material added (see below with reference to FIGS. 7 to 12).

These various manufacturing strategies may for example be taken into consideration during the step 108 of determining the extra thicknesses 9 of the intermediate optical element 10, or at the moment of the determination of the geometry of this intermediate optical element 10 (step 110).

It will also be noted that the data of this file are also representative of modifications associated with a possible dimensional shrinkage and a possible index variation of the intermediate optical element 10.

The first unit 2 may also be configured to initiate the additive manufacture of the intermediate optical element 10 on the manufacturing holder 12 in the additive manufacturing machine 1, based on the characteristics in the manufacturing file generated in the step 114 (step 100 in FIG. 3).

This first command-control unit 2 is therefore configured to run a software package designed to implement various steps of the process for manufacturing the ophthalmic lens, this software package using the received parameters to determine the manufacturing settings of the intermediate optical element 10, or even to produce the intermediate optical element 10.

The command-control unit 22 (called the second unit) of the soft polishing machine 21 is for its part configured to implement a predetermined soft polishing process, having polishing data similar to those received by the first unit 2 in step 107, which data are taken into account in the determination of the extra thicknesses 9 of the intermediate optical element 10.

These polishing data are identical to those mentioned above, namely the diameter of the polishing pupil and/or the smoothing (or filtering) capacities of the machine that are for example characterized by its cut-off spatial frequency and/or its cut-off spatial wavelength. It may also be a question of technical parameters of the soft polishing machine such as the speed of rotation of the intermediate optical element, the scan speed, the number of scans, the pressure that the polisher exerts on the surface of the optical element, the path followed by and the amplitude of the scan of the polisher, the mechanical properties of the polisher (including its dimensions and its structure), the size, the concentration and/or the hardness of the abrasive particles.

The second unit 22 is configured to initiate one and only one step of soft polishing of at least one face 15, 16 of the obtained intermediate optical element 10 on the manufacturing holder 32 in the soft polishing machine, in order to remove the determined material thickness e by means of a polishing pupil similar to that defined and used to determine the geometric envelope of the intermediate optical element 10, and thus generate the ophthalmic lens 30 with its prescribed optical function and having faces 35 and 36 that have a roughness of optical quality.

As a variant, a plurality of successive steps of soft polishing the same face may be carried out.

Variant embodiments of the process and in particular of the step of determining the manufacturing settings, depending on the chosen improved manufacturing strategy, will now be described in more detail.

Figure 5:
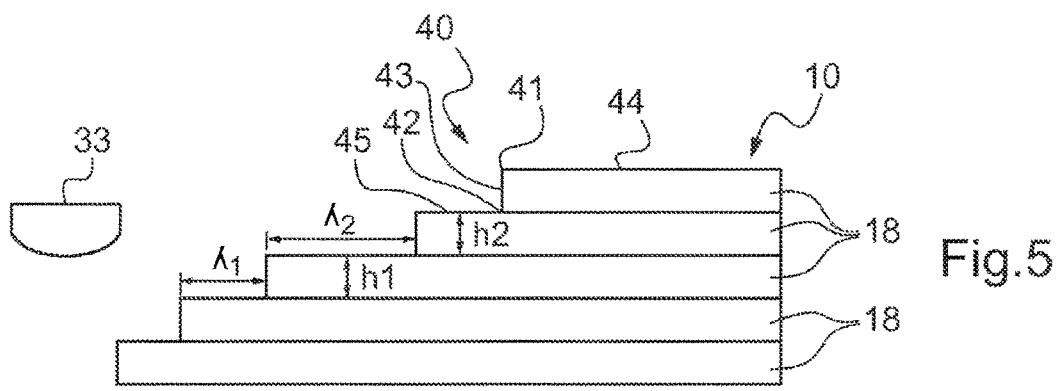
FIG. 5 partially and schematically shows the intermediate optical element of FIG. 2 in the soft polishing machine of the system illustrated in FIG. 1.

FIG. 5 illustrates a detail of the surface of the intermediate optical element 10 shown in FIG. 2, on its first-face side (the first face is not shown) and a representation of the polishing pupil 33 of predetermined diameter, for example comprised between about 0.5 mm and about 2.5 mm, which pupil is characteristic of the soft polishing step.

In this detail, five superposed layers of material 18 are partially shown, the first-face-side ends of which layers may be seen. On the surface of the intermediate optical element 10 at the junction between two immediately superposed layers the thickness (or height) h ($h_1$, $h_2$) of which is predetermined, a stair-step having a length λ ($\lambda_1$, $\lambda_2$) is formed. Here, the height and length of two stair-steps are shown: $h_1$ and $\lambda_1$ and $h_2$ and $\lambda_2$, respectively.

This detail also shows the asperities 40 formed in the successive layers, and in particular at the interface of each pair of superposed layers.

Each asperity is here provided with a peak 41, also called a high point, that is located at the free end at the upper surface 44 of an upper layer, and a depression 42, also called a low point, that is located at the junction between the end of the upper layer and the lower layer immediately below.

Each asperity 40 is furthermore provided with a shoulder 43 arranged between the peak 41 and the depression 42 and substantially representative of the height of a voxel located at the end of the stair-step.

FIG. 6 very schematically illustrates, in perspective and in cross section, a single asperity 40, of the stair-step type here, before it has been polished in a soft polishing step, and also, in cross section, this asperity 40 after it has been polished by means of the soft polishing machine 21.

The asperity 40 before soft polishing is identical to that described above with reference to FIG. 5.

After the soft polishing step has been implemented, the asperity has or has almost disappeared to form a substantially curved surface 46 that is said to be polished, which polished surface joins both the upper surface 44 of the upper layer and the lower surface 45 of the lower layer.

It will be noted that this surface 46 corresponds, after soft polishing, to a zone of the face of the lens the diameter of which is here substantially similar to that of the polishing pupil. The width of this zone is denoted D. This zone of the face of the lens is a zone of action of the polishing pupil on the single asperity present on the face of the intermediate optical element 10 before the soft polishing. The width of this zone corresponds substantially to the spreading length of the asperity after soft polishing.

FIG. 7 illustrates a first improved additive manufacturing strategy.

Here, the intermediate optical element 10 is inclined by an angle θ, determined in steps 108 to 114, relative to a predetermined additive construction axis 48, called the stratification axis, along which the plurality of predetermined volume elements of at least one material is deposited.

Additive manufacturing technology operates by depositing a plurality of layers of voxels on one another so as to manufacture a volume formed from a plurality of layers superposed along a stratification axis that corresponds here to an axis normal to the layers.

It will be noted that the angle of inclination θ is determined so that in at least one determined zone of the face of the intermediate optical element 10 the asperities 40 are spaced apart from one another by a distance smaller than a critical distance determined depending on the diameter of the polishing pupil.

The critical distance is here smaller than or equal to half, or even one quarter of and preferably one tenth of, the diameter of the polishing pupil.

It will be noted that the manufacturing settings of the intermediate optical element 10 are configured so that said asperities are concentrated in a useful area of the intermediate optical element 10.

By "useful area" what is meant here is an area of the intermediate optical element the outline of which corresponds to an outline matching the shape of the predetermined frame into which the target ophthalmic lens 30 is configured to be fitted.

Such a manufacturing strategy advantageously allows the number of stair-step jumps (peaks and depressions), and therefore the number of asperities on the face of the intermediate optical element 10, to be increased, in comparison with an additive manufacture without inclination of the element 10 during its manufacture.

Thus, in the soft polishing step, the polishing pupil attacks a larger number of asperities in a given zone.

Figure 8:
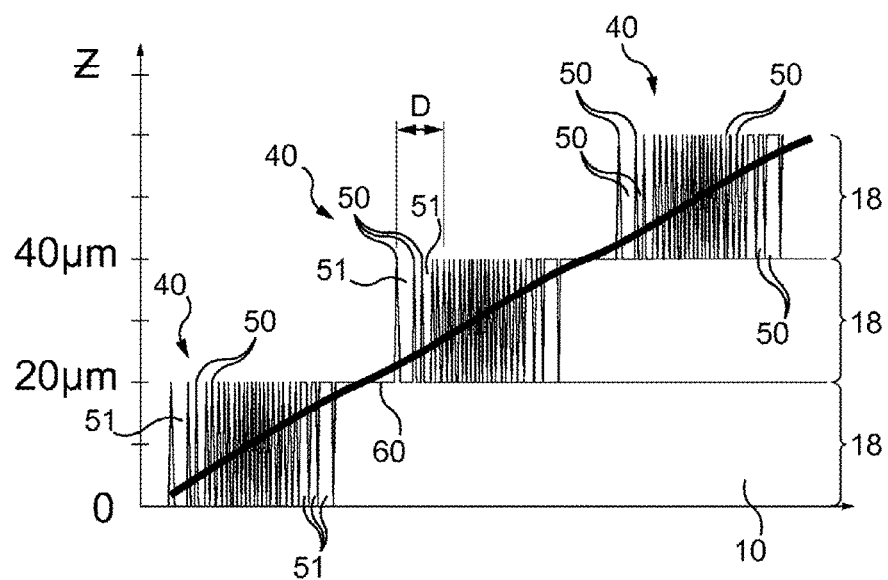

FIG. 8 illustrates a second improved additive manufacturing strategy that may be used as an alternative or in addition to the first strategy.

Here, the manufacturing settings of the intermediate optical element 10 are determined according to a manufacturing strategy improved in amount of material added, which is equivalent to a strategy in which a choice is made whether or not to deposit predetermined volume elements of the material and therefore whether or not to introduce holes that correspond to interruptions into the layers of material.

More precisely, the manufacturing settings of the intermediate optical element 10 are determined so that the latter has, in cross section, on at least one of its faces 15 and 16, manufacturing zones of a first type that are each provided with a plurality of first segments 50 and second segments 51 formed in alternation.

The first segments 50 are each provided with predetermined volume elements of the material and the second segments 51 are each at least partially devoid of elements of the material.

Thus, this layer-interruption-including construction allows asperities to be formed in these manufacturing zones of the first type, these asperities 40 being spaced apart from one another by a distance smaller than a determined critical distance depending on the diameter of the polishing pupil.

The critical distance is here smaller than or equal to half, or even one quarter of and preferably one tenth of, the diameter of the polishing pupil.

This optimization strategy makes it possible to create many layer interruptions for any pair of layers of elements of material. Thus, in the example in FIG. 8, although the structure includes only three layers of material, each layer having a thickness comprised between 5 μm and 50 μm, about 60 layer interruptions have been formed, i.e. about 120 layer fronts along the cross-sectional axis of this figure. This strategy may thus be likened to a scrambling of a layer jump, making it possible to form, on a surface, a passage from one layer to another, by virtue of multiple layer interruptions.

The manufacturing settings of the intermediate optical element 10 are configured so that said asperities are concentrated in a useful area of the intermediate optical element 10.

Such a manufacturing strategy advantageously allows the number of step jumps (peaks and depressions), and therefore the number of asperities on the face of the intermediate optical element 10, to be increased, in comparison with an additive manufacture without manufacturing improved in amount of material.

Thus, in the soft polishing step, the polishing pupil attacks a larger number of asperities in a given zone.

The manufacturing zones of the first type may be provided with predetermined volume elements of a material or of a plurality of distinct materials.

The manufacturing zones of the first type are here defined by a sliding cylinder of axis normal to the surface of the target ophthalmic lens 30, the total volume of the extra thickness 9 in this sliding cylinder remaining substantially constant. The sliding cylinder here has a diameter similar to that of the characteristic polishing pupil of the soft polishing step. The intermediate optical element 10 is here manufactured so that it has a plurality of manufacturing zones of the first type that are formed in distinct layers, and that do not overlap.

In other words, each manufacturing zone of the first type is arranged in a layer without encroaching on another layer.

As a variant, at least one of the manufacturing zones of the first type may be formed in a layer that overlaps a lower layer immediately below.

Again as a variant, at least one of the manufacturing zones of the first type may be formed in two distinct immediately superposed layers.

It will be noted that the amount of material in the sliding cylinder, which amount is shown by the profile 60 in FIG. 8, is substantially equal to the amount of material "seen" when the sliding cylinder follows the profile of the corresponding target surface, so that the curve 60 and the target surface are substantially equal.

In other words, a manufacturing zone of the first type, in which an optimization strategy is implemented, generally extends over a segment of the profile of the target surface of the lens to be manufactured. This zone of the first type for example has a predetermined surplus of voxels forming a volume of the extra thickness. This volume seen along the segment of the profile is substantially constant. This means that if an element having an internal volume is considered moving along the segment of the profile of the target lens, this element includes in its internal volume, at any position on the segment of the profile, substantially the same amount of material that forms the extra thickness. This element is here called the sliding cylinder.

It will also be noted that the predetermined volume elements called voxels may have different sizes during the construction in the manufacturing zones of the first type; and/or that the first segments do not all have the same sizes in a zone of the first time. For example, their widths are different and/or their heights are different. One first segment may be a predetermined distance from another first segment, these segments being separated by a second segment, and said distance may be smaller than the minimum width of a voxel.

It will be noted that this manufacturing strategy improved in amount of material may not solely be a dispersion of voxels of the same volume. Specifically, the first and second segments may include one or more voxels that are larger or smaller than the voxels of at least one adjoining segment.

Thus, it is possible to introduce a variation in the volume of the dispersed voxels to obtain a plurality of segment states, namely an empty state in which no voxel is deposited, a recessed state in which a voxel of size that is said to be small relative to the average size of the voxels of the layer is deposited, a full state in which a voxel of average size is deposited, and an overfull state in which a voxel of size larger than the average size is deposited.

The use of voxels of various volumes, when this is possible (dependent on the additive manufacturing technology used) makes it possible to obtain a high degree of flexibility in the improved manufacturing since only the minimum size of the voxels is fixed.

When the technology used does not allow voxels of variable volume to be deposited, the depressions are not limited to the size of one voxel. Specifically, it is possible to deposit voxels so as to create a depression circumscribed between said voxels, the depression being slightly smaller or slightly larger than one voxel or than a volume that is a multiple of the size of one voxel.

FIGS. 9A and 9B, 10A and 10B and 11A to 11C illustrate three variant embodiments of the second improved additive manufacturing strategy, respectively.

Figure 9A:
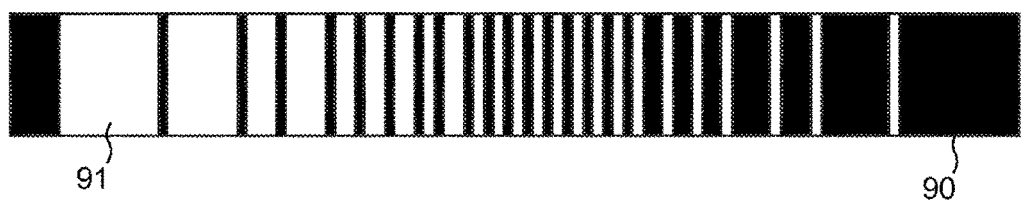
Figure 9B:

FIGS. 9A and 9B in particular schematically show a system for scrambling layer jumps having a substantially radial pattern, i.e. a pattern that extends along an axis, which is said to be of greatest slope, applied to the ophthalmic lens.

This scrambling system is characterized by a succession of layer interruptions that form a unique transition from an nth layer to an nth+1 layer, these interruptions being illustrated, as seen from above (FIG. 9A) and by virtue of a cross-sectional view (FIG. 9B) taken along a local, here radial, axis of greatest slope for an ophthalmic lens.

FIG. 9A thus illustrates an outline of a layer front scrambled by a succession of alternations of first bands 90 of the nth+1 layer, in black, separated by second bands 91 in which the nth+1 layer is absent and the nth layer is on top.

In FIG. 9B, it may be seen that the first bands 90 have a width that, in the cross section, increases in the direction of a region of higher average altitude (from the left to the right in FIG. 9B); whereas the second bands 91 have a width that, in the cross section, increases in the direction of a region of lower average altitude (from the right to left in FIG. 9B).

This succession of first bands 90 and second bands 91 is therefore representative of a radial scrambling of the curvature of the ophthalmic lens.

Figure 10A:
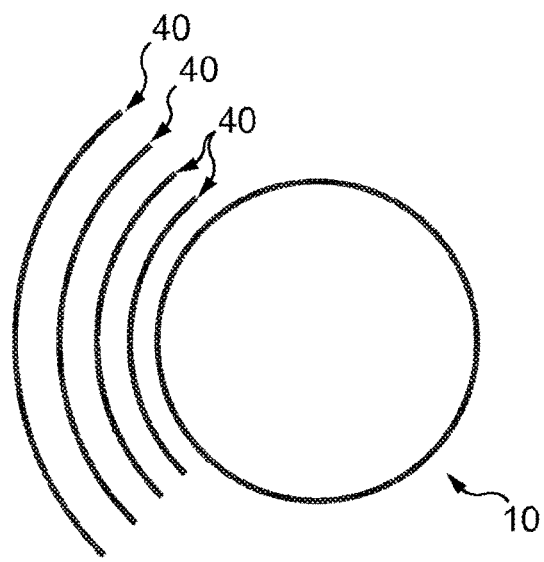
Figure 10B:
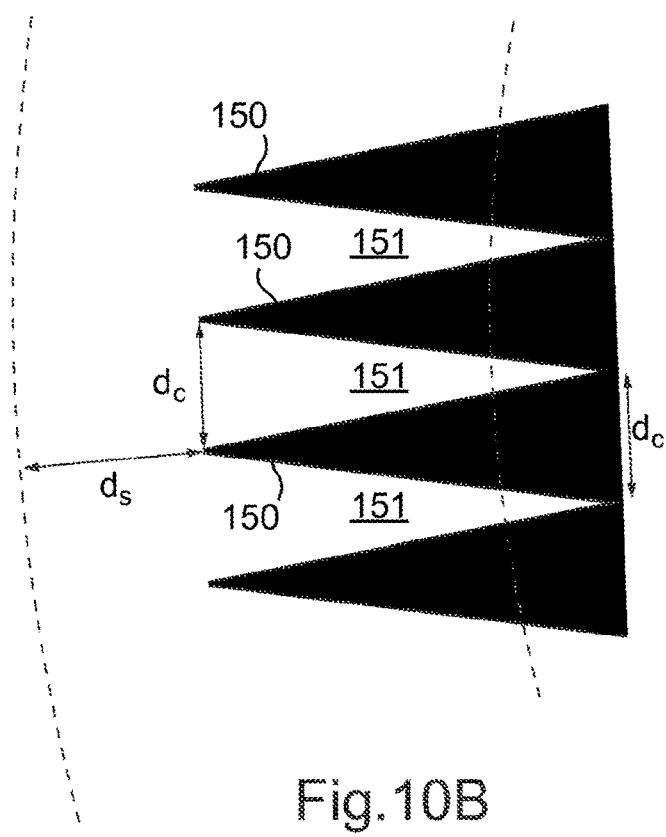

FIGS. 10A and 10B are partial schematics of the intermediate optical element 10 showing a view of the entirety thereof (FIG. 10A) and a view of a detail thereof (FIG. 10B), focusing on another variant of the scrambling of a layer jump.

Here, the manufacturing settings of the intermediate optical element 10 are also determined according to a manufacturing strategy improved in amount of material added, which is equivalent to a strategy in which a choice is made whether or not to deposit predetermined volume elements of material and therefore, for example, whether or not to introduce holes that correspond to interruptions into the layers of material.

The manufacturing settings of the intermediate optical element 10 are therefore also determined here so that the latter has, in cross section, on at least one of its faces, manufacturing zones of a first type that are each provided with a plurality of first segments 150 and second segments 151 formed in alternation.

The first segments 150 are each provided with predetermined volume elements of the material and the second segments 151 are each at least partially devoid of elements of the material.

In contrast to the strategy illustrated in FIGS. 9A and 9B in which the alternation of first and second bands 90 and 91 extends radially, i.e. at least in a general direction that is overall parallel to an axis of greatest slope between the layers, the alternation of the first and second segments 150 and 151 here mainly extends in a general direction that is overall perpendicular to the axis of greatest slope between layers. In particular, in an ophthalmic lens, the first and second segments therefore alternate in a direction that is overall ortho-radial relative to the optical axis of the lens. This direction may be a local axis, or a curve, that is substantially ortho-radial relative to the curvature of the final lens.

This succession of first segments 150 and second segments 151 is therefore representative of an ortho-radial scrambling of the curvature of the ophthalmic lens.

In this nonlimiting example, the first segments and the second segments are arranged as simply as possible, i.e. so as in fact to form only a single first portion and a single second portion. Thus, in this embodiment, there is a single layer front for each layer, despite a multiplicity of layer interruptions being produced if a direction orthogonal to an axis of greatest slope is considered.

The structure in FIG. 10B may here be described by means of a geographical analogy, with the axis of gravity corresponding to the stratification axis, as a succession of promontories of the first zone, imbricated with a succession of valleys, forming the second zones. The promontories and the valleys have peak-shaped ends oriented in a direction of greatest slope, the ends of the promontories are directed toward a region of lower altitude and the ends of the valleys are directed toward a region of higher altitude. The ends of the promontories are separated by about the critical distance and the ends of the valleys are also separated by about the critical distance.

The layer jumps 40 illustrated in FIG. 10A are schematically represented by dashed lines in the top view of the intermediate optical element 10 in FIG. 10B. It will be noted that these layer jumps 40 would correspond to layer fronts or asperities if no improved additive manufacturing strategy were applied.

It may be seen that the peaks of two consecutive first segments 150 are here spaced apart by a distance smaller than or equal to about the determined critical distance, denoted dc.

It may also be seen that the peaks of the first segments 150 are here located away from elements forming the adjacent layer jump by a distance, denoted ds, substantially of the order of magnitude of the determined critical distance dc.

In the same way as the manufacturing strategy illustrated in FIG. 8, the manufacturing zones of the first type may be provided with predetermined volume elements of one or more distinct materials.

The manufacturing zones of the first type are here also defined by a sliding cylinder of axis normal to the surface of the target ophthalmic lens, not passing right through the lens, the total volume of the extra thickness in this sliding cylinder remaining substantially constant. The sliding cylinder here has a diameter similar to that of the characteristic polishing pupil of the soft polishing step.

It will be noted that the amount of material in the sliding cylinder is substantially equal to the amount of material "seen" when the sliding cylinder follows the profile of the corresponding target surface.

As mentioned above, this means that if an element having an internal volume is considered moving along the segment of the profile, this element includes in its internal volume, at any position on the segment of the profile, the same amount of material that forms the extra thickness. This element is here called the sliding cylinder.

The profile of the first segments 150 may be different from that illustrated in FIG. 10B, namely a toothed profiled with straight ramps. For example, the profile may be toothed with curved, concave and/or convex ramps.

FIG. 10B shows only zones of the first type that correspond to a single layer jump, but of course, such zones of the first type could be formed for the other layer jumps illustrated in FIG. 10A. It will be noted that the peaks of the first segments 150 of the zones illustrated in FIG. 10B, which correspond to one layer jump, could penetrate depressions of other manufacturing zones of the first type that are not illustrated and that correspond to the adjacent layer jump, and vice versa. In this case, the distances separating the interpenetrated peaks of the zones of the first type relative to the two layer jumps are spaced apart by a distance smaller than the determined critical distance.

FIGS. 11A, 11B and 11C are schematics of another system for scrambling layer jumps comprising dispersed patterns. Here, the successions of layer interruptions that allow a single transition from an nth layer to an nth+1 layer to be formed are shown from above.

These successions of layer interruptions are configured so that the alternations of first and second segments are arranged both along substantially radial cross-sectional axes and along substantially ortho-radial cross-sectional axes (in the sense explained above), along the axis of greatest slope or perpendicularly to this axis, respectively.

FIG. 11A schematically shows an inkjet printed analogy to this system for scrambling layer jumps, representative of an improved additive manufacturing strategy.

A series of patterns formed by the first zones and the second zones are illustrated and allows a single layer jump between an nth layer and an nth+1 layer to be scrambled. This series has a first uniformly white pattern, representative of one level of the nth layer, and a second uniformly black pattern, representative of a level of the nth+1 layer. Between these first and second patterns are present a plurality of other intermediate patterns comprising various arrangements of black regions and white regions. These intermediate patterns are arranged so that the patterns that include the most black, i.e. those including first zones that cover most of these patterns, are closest to the second pattern on the level of the layer nth+1, and the patterns that include the most white, i.e. those including second zones that cover most of these patterns, are closest to the first pattern on the level of the nth layer.

Thus, within a given intermediate pattern, the first and second zones have sizes and distributions such that the material is distributed as uniformly as possible. However, it will be clear to those skilled in the art that this variant of the invention is not limited to the specifically illustrated patterns.

FIGS. 11B and 11C illustrate, as seen from above, two very different patterns that have substantially equivalent average densities of black and white.

In the pattern illustrated in FIG. 11B, the first zones are substantially the shape of crosses of three voxels by three voxels. The crosses of the first zones are aligned with one another, at least with four neighbors and are separated from one another by second zones each formed by the absence of a single voxel.

In the pattern illustrated in FIG. 11C, the first zones are substantially the shape of squares of about three voxels by three voxels. The squares of the first zones are not aligned with the neighboring squares and they are separated from one another by a single second zone that is continuous between all the first zones.

FIG. 12 illustrates a third improved additive manufacturing strategy that may be used as an alternative or in addition to the first strategy and/or the second strategy.

Here, the manufacturing settings of the intermediate optical element 10 are determined according to a manufacturing strategy improved in amount of material added, which is equivalent to a strategy in which a choice is made whether to deposit predetermined volume elements of one or more materials, these predetermined volume elements having distinct abradability properties.

More precisely, the manufacturing settings of the intermediate optical element 10 are determined so that the latter has, in cross section, on at least one of its faces 15 and 16, manufacturing zones of a second type that are each provided with predetermined volume elements of one or more materials having distinct abradability properties.

This construction including predetermined volume elements of variable abradability property allows manufacturing zones that are particularly suitable for soft polishing to be formed.

Each manufacturing zone of the second type is here defined so as to form a stair-step and thus an asperity 40 formed from a peak and a depression and the abrasion difficulty of which is variable.

It will be noted that the one or more predetermined volume elements that are in immediate proximity to the asperity or that form the peak and the depression are here easier to abrade than the one or more predetermined volume elements that are located away from this peak and this depression. For example, the closer the point considered is to the peak and depression of the asperity 40, the more the one or more predetermined volume elements are formed by a material that is friable relative to that used for the body of the intermediate optical element, or are formed by a material including a porosity agent.

The deposited voxels may thus have resistances to abradability that differ from one voxel to another. This is for example possible by adding to a main material, in determined proportion, either a pore-forming agent that leads a voxel made of porous material to form before the polishing step, or an agent increasing the resistance to abrasion such as nanoparticles of silica or zirconia or another oxide.

Alternatively, the voxels may have a different resistance to abradability from one voxel to another voxel by virtue of the mixture, in variable proportion, of two materials of different abradability. Lastly, the voxels may have a different resistance to abradability from one voxel to another voxel by variation of a degree of polymerization from one to the other.

The intermediate optical element 10 is here manufactured so that it has a plurality of manufacturing zones of the second type that are formed in distinct layers, but that do not overlap.

In other words, each manufacturing zone of the second type is arranged in a layer without encroaching on another layer.

As a variant, at least one of the manufacturing zones of the second type may be formed in a layer that overlaps a lower layer immediately below.

Again as a variant, at least one of the manufacturing zones of the second type may be formed in two distinct immediately superposed layers.

It will be noted that the intermediate optical element 10 may be manufactured by implementing one or more of the three improved manufacturing strategies illustrated in FIGS. 7 to 9.

In other words, the intermediate optical element 10 may for example contain manufacturing zones of the first type and of the second type in a given layer and/or in distinct layers.

In one variant (not illustrated) a client-server communication interface has what is referred to as a provider side and what is referred to as a client side, these two sides communicating over a network, for example the Internet.

The provider side comprises a server connected to command-control units of the same type as those in FIG. 1, but this time not integrated into a manufacturing system, and in particular not integrated into additive manufacturing and soft polishing machines, this server being configured to communicate with the Internet interface.

The client side is configured to communicate with the Internet interface, and is connected to one or more command-control units of the same type as those on the provider side.

Furthermore, the one or more client-side units are connected to an additive manufacturing machine, of the same type as that in FIG. 1, for manufacturing the intermediate optical element, and to at least one soft polishing machine for manufacturing the ophthalmic lens from the intermediate optical element.

The one or more client-side units are configured to receive the data files corresponding to steps 101, 102 and 107, and the data characteristic of the material used.

The one or more client-side units transmit via the Internet interface and the server these data to the one or more provider-side units in order to determine the manufacturing settings of the intermediate optical element and to determine the manufacturing settings of the ophthalmic lens.

The one or more provider-side units run, via their data processing systems, the computer program that they contain, to implement the manufacturing process, and thus deduce, on the one hand, the manufacturing settings for the manufacture of the intermediate optical element, and on the other hand, the manufacturing settings for the manufacture of the ophthalmic lens.

The one or more provider-side units transmit, via the server and the network, a determined file representative of the manufacturing settings of the intermediate optical element and a determined file representative of the manufacturing settings of the ophthalmic lens to the one or more client-side command-control units.

The one or more client-side units are configured to run a software package for implementing the manufacturing process of the ophthalmic lens, using the received parameters, in order to produce the intermediate optical element and then the ophthalmic lens.

In one variant (not illustrated), the additive then soft polishing manufacturing steps may be followed by deposition of a varnish film chosen in order to mitigate remaining surface irregularities. In particular, reference is here made to varnish layers, such as those presented in the patent applications EP1896878 of the Applicant, or JP 2002-182011, which are configured to allow a surface having a certain quality very close to ophthalmic quality to achieve this ophthalmic quality. Just like the soft polishing, the application of this varnish layer does not modify the main curvatures of the surface of the lens, such as the main curvature or a pattern tracing the one or more additions.

As variants (not illustrated):
- the manufacturing system includes only one and the same machine into which additive manufacturing and soft polishing devices are integrated;
- the superposed and juxtaposed plurality of predetermined volume elements forms superposed layers that each have a thickness that is constant or that varies over their length and/or that all do or do not have the same thickness;
- the material is for example a transparent material deposited by stereolithography, such as for example an epoxy polymer marketed by the company 3D SYSTEMS under the trademark Accura® ClearVue;
- the material is a photopolymerizable composition comprising one or more families of molecules having one or more acrylic, methacrylic, acrylate or methacrylate functions; a family of molecules having one or more epoxy, thioepoxy or thiolene functions; a family of molecules having one or more vinyl ether, vinyl caprolactam or vinylpyrrolidone functions; a family of hyperbranched or hybrid organic/inorganic materials; or a combination of these functions; the mentioned chemical functions possibly being carried by monomers or oligomers or a combination of monomers and oligomers;
- the material may comprise at least one photoinitiator;
- the material may comprise colloids, in particular colloidal particles of smaller size for example than visible wavelengths, such as for example colloidal particles of silicon oxide SiO2 or colloidal particles of zirconium oxide ZrO2;
- the material may comprise, in at least certain of the predetermined volume elements, a pigment or dye, for example a dye belonging to the azo or rhodamine or cyanine or polymethine or merocyanine or fluorescein or pyrylium or phthalocyanine or perylene or benzanthrone or anthrapyrimidine or anthrapyridone families, or even a metal-complex dye such as rare-earth cryptates or chelates;
- the intermediate optical element is produced from other materials, such as polycarbonate, polymethyl methacrylate, polyamide or from the following polymers: thiourethane polymers, allyl-carbonate polymers, acrylic polymers, urethane polymers and/or episulfide polymers; these materials being well known to those skilled in the art in the field of ophthalmic lenses;
- the intermediate optical element may comprise on at least one face one or more treatments including an antireflection treatment, an anti-smudge treatment, an anti-scratch treatment, an antishock treatment and a polarization filter;
- the aforementioned treatments may for example be produced by transfer or by lamination, or in other words adhesive bonding, of a functional film;
- the additive manufacturing holder has a manufacturing surface on which the intermediate optical element is additively manufactured, which manufacturing surface is at least partially planar and/or at least partially spherical;
- the process furthermore comprises one or more other manufacturing steps, for example an edging step and/or a marking step used to form what are usually referred to as temporary markings;
- the additive manufacturing process comprises an additional thermal irradiation step in which the whole of the additively manufactured structure is polymerized or set;
- the manufacturing process comprises a step in which the variation in the index of the intermediate optical element material may be taken into account by way of an iterative optimization loop according to known optimization procedures;
- the material of the intermediate optical element optionally comprises one or more dyes, and/or nanoparticles configured to modify its optical transmission and/or its appearance, and/or nanoparticles or additives configured to modify its mechanical properties;
- the additive manufacturing machine is not a three-dimensional printing machine but rather a stereolithography machine (or SLA for stereolithography apparatus) or a thermoplastic filament extrusion machine, also called a fused deposition modelling machine (or FDM machine);
- at least one command-control unit comprises a microcontroller instead of a microprocessor;
- the client-server communication interface comprises devices configured to transfer the manufacturing settings of the determined intermediate optical element to a computer program, which contains instructions configured to implement each of the steps of the manufacturing process described above when this computer program is run in at least one command-control unit that comprises system elements configured to run said computer program;
- the communication interface enables communication via means other than the Internet, for example via an intranet or a secure private network; and/or
- the communication interface makes it possible to transfer the entire computer program to a remote data processing system so as to implement the manufacturing process in another manufacturing system provided with an additive manufacturing machine and a soft polishing machine, and optionally in one or more other processing/treatment machines.

It is recalled more generally that the invention is not limited to the examples described and shown.

The invention claimed is:

1. A process for manufacturing an ophthalmic lens comprising at least one optical function, comprising:
additively manufacturing an intermediate optical element by depositing a plurality of predetermined volume elements of at least one material having a predetermined refractive index, the intermediate optical element comprising a target ophthalmic lens adjoined to at least one extra amount of material, called an extra thickness, consisting of a portion of the plurality of volume elements; and
manufacturing by soft polishing the target ophthalmic lens from the intermediate optical element, by at least partial subtraction of the at least one extra thickness so as to filter asperities formed on at least one face of the intermediate optical element during the additive manufacturing;
wherein additively manufacturing comprises determining manufacturing settings of the intermediate optical element, the extra thickness is determined depending on predetermined parameters of the soft polishing, the parameters comprising a geometric characteristic representative of a cut-off spatial frequency and a geometric characteristic representative of a material removal capacity.

2. The process of claim 1, wherein determining the manufacturing settings of the intermediate optical element is adapted so that, at least in a determined zone of the face of the intermediate optical element, the asperities are spaced apart from one another by a distance smaller than a critical distance determined depending on a value of the geometric characteristic representative of the cut-off spatial frequency.

3. The process of claim 2, wherein the geometric characteristic representative of the cut-off spatial frequency corresponds to a diameter of a characteristic polishing pupil of the soft polishing and the critical distance is smaller than or equal to half of the diameter of the polishing pupil.

4. The process of claim 3, wherein the geometric characteristic representative of the cut-off spatial frequency corresponds to a diameter of a characteristic polishing pupil of the soft polishing, and the critical distance is smaller than or equal to one quarter of the diameter of the polishing pupil.

5. The process of claim 4, wherein the geometric characteristic representative of the cut-off spatial frequency corresponds to a diameter of a characteristic polishing pupil of the soft polishing and the critical distance is smaller than or equal to one tenth of the diameter of the polishing pupil.

6. The process of claim 3, wherein determining the manufacturing settings of the intermediate optical element is adapted so that the intermediate optical element is inclined relative to a predetermined additive construction axis, referred to as a stratification axis, along which the plurality of predetermined volume elements of at least one material is deposited.

7. The process of claim 6, wherein determining the manufacturing settings of the intermediate optical element is adapted so that the intermediate optical element has, in cross section, on its face at least one manufacturing zone of a first type that is provided with at least two first segments and at least one second segment, which segments are formed in alternation, the first segments each being provided with at least one predetermined volume element of the material and the at least one second portion being at least partially devoid of predetermined volume elements of the material; by virtue of which asperities are formed in this manufacturing zone of the first type.

8. The process of claim 7, wherein the at least one manufacturing zone of the first type is provided with predetermined volume elements of a material or of a plurality of distinct materials.

9. The process of claim 8, wherein the at least one manufacturing zone of the first type is defined by a sliding cylinder of axis normal to the surface of the target ophthalmic lens, the total volume of the extra thickness in this sliding cylinder remaining substantially constant.

10. The process of claim 9, wherein the sliding cylinder has a diameter similar to or smaller than that of a characteristic polishing pupil of the soft polishing.

11. The process of claim 10, wherein determining the manufacturing settings of the intermediate optical element is adapted so that the intermediate optical element has, in cross-section, on its face at least one manufacturing zone of a second type, provided with a plurality of predetermined volume elements of one or more materials, the predetermined volume elements having distinct abradability properties.

12. The process of claim 11, wherein the additive manufacturing is adapted to form a plurality of superposed layers of the predetermined volume elements, and the intermediate optical element thus manufactured has at least two manufacturing zones of the first type and/or of the second type, which zones are formed in distinct layers.

13. The process of claim 12, wherein the additive manufacturing is adapted to form a plurality of superposed layers of the predetermined volume elements, and the intermediate optical element thus manufactured has at least one manufacturing zone of the first type and/or of the second type, which zone is formed in at least two immediately superposed layers.

14. A system for manufacturing an ophthalmic lens comprising:
   an additive manufacturing machine for manufacturing an intermediate optical element;
   a soft polishing machine for manufacturing an ophthalmic lens from the intermediate optical element; and
   at least one command-control unit provided with system elements adapted to run a computer program including instructions adapted to implement the process of claim 1.

15. The system of claim 14, wherein the soft polishing machine has a polisher and an actuating kinematic of the polisher, which is dependent on the polisher, which polisher and actuating kinematic pair confer on the soft polishing machine a given soft polishing pupil and a given material removal capacity.

16. The system of claim 15, wherein the additive manufacturing machine is a three-dimensional printing, or stereolithography machine, a mask projection stereolithography machine a selective laser melting or sintering machine, or a thermoplastic filament extrusion machine.

17. The system of claim 16, wherein the additive manufacturing machine includes a manufacturing holder that is removable and adapted to serve as a manufacturing holder for the soft polishing machine.

* * * * *